(12) United States Patent
Fish et al.

(10) Patent No.: US 11,623,474 B2
(45) Date of Patent: Apr. 11, 2023

(54) ROTOR DRIVE KEY AND FASTENER ASSEMBLY

(71) Applicant: Honeywell International Inc., Morris Plains, NJ (US)

(72) Inventors: Bradley E. Fish, Elkhart, IN (US); Tomasz Majnert, Mishawaka, IN (US)

(73) Assignee: Honeywell International Inc., Charlotte, NC (US)

( * ) Notice: Subject to any disclaimer, the term of this patent is extended or adjusted under 35 U.S.C. 154(b) by 330 days.

(21) Appl. No.: 16/832,868

(22) Filed: Mar. 27, 2020

(65) Prior Publication Data
US 2021/0300110 A1    Sep. 30, 2021

(51) Int. Cl.
*B60B 27/00* (2006.01)
*B64C 25/44* (2006.01)

(52) U.S. Cl.
CPC .......... *B60B 27/0052* (2013.01); *B64C 25/44* (2013.01)

(58) Field of Classification Search
CPC ............................ B60B 27/0052; B64C 25/44
See application file for complete search history.

(56) References Cited

U.S. PATENT DOCUMENTS

| | | |
|---|---|---|
| 2,990,216 A | 6/1961 | Albright et al. |
| 4,084,857 A | 4/1978 | VanderVeen |
| 5,050,411 A | 9/1991 | Kawachi et al. |
| 5,186,521 A | 2/1993 | Niespodziany et al. |
| 5,199,536 A | 4/1993 | Clark |
| 5,931,269 A | 8/1999 | Detwiler et al. |
| 6,003,954 A | 12/1999 | Everhard et al. |
| 6,363,918 B2 | 4/2002 | Hakansson et al. |
| 7,390,067 B2 | 6/2008 | Tong et al. |
| 7,475,762 B2 | 1/2009 | Kaczynski et al. |
| 7,488,044 B2 | 2/2009 | Scelsi et al. |
| 8,430,457 B2 | 4/2013 | Baldassara |
| 8,668,276 B2 | 3/2014 | Hall et al. |
| 9,193,448 B2 | 11/2015 | Crescenzo et al. |

(Continued)

FOREIGN PATENT DOCUMENTS

| | | |
|---|---|---|
| EP | 3258129 A1 | 12/2017 |
| EP | 3763962 A1 | 1/2021 |
| GB | 841469 | 7/1960 |

OTHER PUBLICATIONS

Response to Extended European Search Report dated Aug. 20, 2021, from counterpart European Application No. 21161390.6, filed Sep. 23, 2021, 62 pp.

(Continued)

*Primary Examiner* — Jason R Bellinger
(74) *Attorney, Agent, or Firm* — Shumaker & Sieffert, P.A.

(57) ABSTRACT

In some examples, an assembly includes a rotor drive key configured to fit around a wheel boss defined by a wheel. The rotor drive key includes a support structure. The assembly further includes a fastener configured to extend the wheel boss and the support structure in a substantially axial direction of the wheel when the rotor drive key fits around the wheel boss, where the fastener is configured to limit movement of the rotor drive key relative to the wheel boss. The fastener may be rotated to establish and/or increase a contact pressure between the fastener and the rotor drive key to help the fastener limit movement of the rotor drive key relative to the wheel boss.

20 Claims, 16 Drawing Sheets

(56) References Cited

U.S. PATENT DOCUMENTS

| | | |
|---|---|---|
| 2006/0006729 A1 | 6/2006 | Rutten |
| 2017/0096217 A1 | 4/2017 | Didey et al. |
| 2020/0102069 A1* | 4/2020 | Beehler ................ F16D 65/092 |
| 2021/0010549 A1* | 1/2021 | Fish ........................ F16D 55/36 |
| 2021/0262526 A1* | 8/2021 | Fish ...................... F16D 65/186 |
| 2021/0317880 A1* | 10/2021 | Fish .......................... F16D 3/06 |

OTHER PUBLICATIONS

Extended Search Report from counterpart European Application No. 21161390.6, dated Aug. 20, 2021, 11 pp.
Notice of Intent to Grant and Text Intended to Grant from counterpart European Application No. 21161390.6 dated Nov. 18, 2022, 129 pp.

* cited by examiner

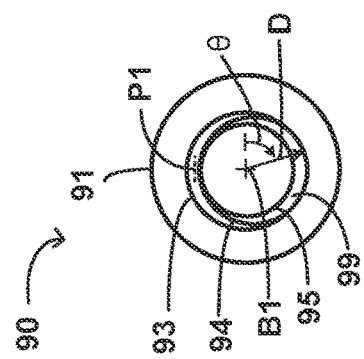
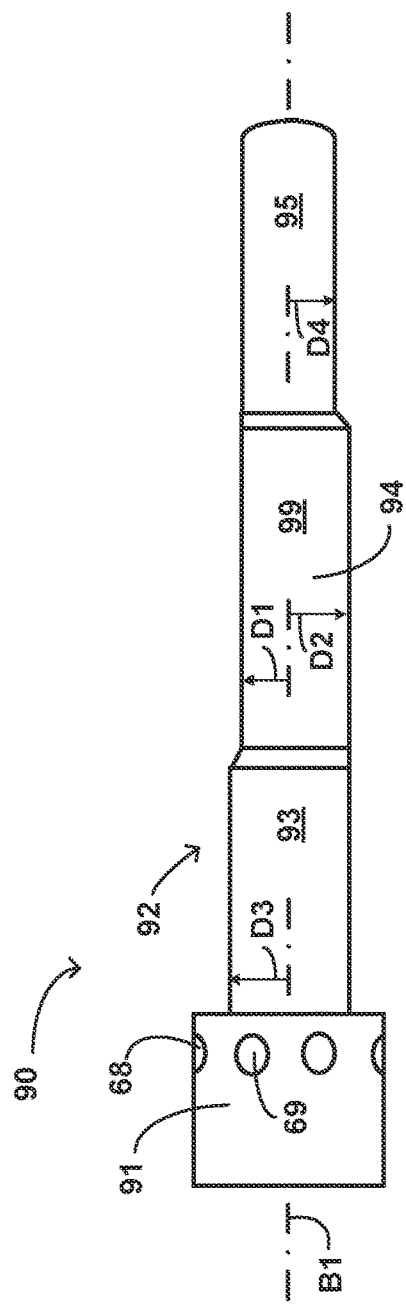
FIG. 6B
FIG. 6A

ROTOR DRIVE KEY AND FASTENER ASSEMBLY

TECHNICAL FIELD

The present disclosure relates to wheel brake systems of a vehicle.

BACKGROUND

Vehicles, such as aircrafts, may use a wheel brake system that includes a multi-disc brake assembly. For example, the multi-disc brake assembly may include a plurality of rotors engaged with a wheel and a plurality of stators interleaved with the rotors. The rotors and wheel are configured to rotate around an axle, while the stators remain stationary. To decelerate rotational motion of a rotating wheel, the brake assembly may displace pistons against a pressure plate to squeeze the rotating rotors engaged with the wheel against the stationary stators, therefore producing torque that decelerates the rotational motion of the wheel. In some examples, the rotors may be engaged with the wheel via rotor drive keys positioned on an interior surface of the wheel. In some such examples, the rotors may define slots configured to receive the rotor drive keys.

SUMMARY

In some examples, an assembly includes a rotor drive key configured to be positioned over a wheel boss defined by a wheel, and a fastener configured to extend in a substantially axial direction of the wheel through the wheel boss when the rotor drive key is positioned over the wheel boss to help limit axial movement of the rotor drive key relative to the wheel boss. The fastener includes a shank surface, which is configured to contact a key bearing surface of the rotor drive key when the fastener extends through the wheel boss. In some examples, the wheel boss may be a first wheel boss and the fastener may also be configured to extend through both the first wheel boss and a second wheel boss of the wheel, and the key bearing surface may be between the first wheel boss and the second wheel boss.

In some examples, the shank surface of the fastener and the key bearing surface of the rotor drive key define surfaces extending in an axial direction of the wheel which substantially oppose each other when the fastener extends through the wheel boss. The shank surface may be configured such that rotation of the fastener relative to the wheel boss increases a contact pressure between the shank surface and the key bearing surface when the shank surface contacts the key bearing surface. The increased contact pressure between the shank surface and the key bearing surface may increase a snugness between the rotor drive key and the wheel boss to assist in securing the rotor drive key to the wheel in the radial direction.

An example method of attaching the rotor drive key to an interior surface of a wheel is additionally described herein.

In an example, an assembly comprises: a rotor drive key configured to be positioned over a wheel boss of a wheel, wherein the rotor drive key defines a key bearing surface; and a fastener configured to extend through the wheel boss when the rotor drive key is positioned over the wheel boss, wherein the fastener comprises a shank defining a shank surface, wherein the shank surface is configured to contact the key bearing surface of the rotor drive key when the fastener extends through the wheel boss, and wherein the fastener is configured to limit movement of the rotor drive key relative to the wheel boss.

In examples, the fastener is configured to extend through the wheel boss in an axial direction of the wheel.

In examples, the fastener is configured to limit movement of the rotor drive key in a radial direction of the wheel when the fastener extends through the wheel boss and the shank surface contacts the key bearing surface.

In examples, the fastener is configured such that the shank surface increases a contact pressure with the key bearing surface when the fastener extends through the wheel boss and the rotor drive key is positioned over the wheel boss and when the fastener is rotated around an axis of the fastener shank.

In examples, the shank surface includes a first section and a second section joined to the first section, wherein the second section has a greater curvature than the first section.

In examples, the fastener shank defines a fastener axis and the shank surface defines a displacement from the fastener axis to the shank surface and perpendicular to the fastener axis, wherein the displacement varies from a minimum displacement to a maximum displacement greater than the minimum displacement.

In examples, the shank surface is between a proximal portion and a distal portion of the fastener, wherein the distal portion defines a distal portion displacement from the fastener axis to a surface of the distal section and perpendicular to the fastener axis, wherein the distal portion displacement is less than the maximum displacement of the shank surface.

In examples, the rotor drive key comprises a support structure and the support structure comprises the key bearing surface, the fastener is configured to extend into the support structure, and the shank surface is configured to contact the key bearing surface of the rotor drive key when the fastener extends into the support structure.

In examples, the support structure includes a bore configured to receive the fastener, wherein the key bearing surface defines at least part of the bore.

In examples, the wheel boss is a first wheel boss, and wherein the support structure is configured to insert between the first wheel boss and a second wheel boss of the wheel, and wherein the fastener is configured to extend through the support structure when the shank surface contacts the key bearing surface.

In examples, the support structure is configured to limit movement of the rotor drive key in an axial direction of the wheel when the support structure is positioned between the first wheel boss and the second wheel boss.

In examples, the assembly further comprises the wheel defining an interior surface and comprising the wheel boss along the interior surface, wherein the wheel boss comprises a pair of opposite sides, and wherein the rotor drive key defines a trough configured to surround at least some portion of each of the opposite sides when the rotor drive key is positioned over the wheel boss.

In examples, the wheel boss is a first wheel boss and the interior surface of the wheel defines a second wheel boss, and wherein the trough is configured to surround at least some portion of the second wheel boss when the rotor drive key is positioned over the first wheel boss.

In examples, the key bearing surface is between the first wheel boss and the second wheel boss when the rotor drive key is positioned over the first wheel boss and the shank surface contacts the key bearing surface.

In an example, an assembly comprises: a vehicle wheel defining an interior surface and defining a wheel boss along the interior surface; a rotor drive key configured to be positioned over the wheel boss, wherein the rotor drive key defines a key bearing surface; and a fastener defining a shank surface, wherein the shank surface is configured to contact the key bearing surface of the rotor drive key when the rotor drive key is positioned over the wheel boss and the fastener extends through the wheel boss in a substantially axial direction of the vehicle wheel, and wherein the fastener is configured to limit movement of the rotor drive key in a radial direction of the vehicle wheel when the rotor drive key is positioned over the wheel boss and the shank surface contacts the key bearing surface.

In examples, the wheel boss is a first wheel boss and the vehicle wheel defines a second wheel boss, the rotor drive key comprises a support structure and the support structure includes the key bearing surface, wherein the support structure is configured to insert between the first wheel boss and the second wheel boss and limit movement of the rotor drive key in an axial direction of the vehicle wheel when the rotor drive key is positioned over the first wheel boss, and the fastener is configured to extend through the first wheel boss, the support structure, and the second wheel boss when the shank surface contacts the key bearing surface.

In examples, the fastener is configured such that the shank surface increases a contact pressure with the key bearing surface when the shank surface contacts the key bearing surface and the fastener is rotated around a fastener axis of the fastener shank.

In examples, the shank surface includes a first section and a second section joined to the first section, wherein the second section has a greater curvature than the first section.

In examples, a method comprises: positioning a rotor drive key comprising a key bearing surface around a wheel boss of a vehicle wheel; extending a fastener comprising a shank surface through the wheel boss; and contacting the shank surface and the key bearing surface to limit movement of the rotor drive key in a radial direction of the vehicle wheel.

In examples, the wheel boss is a first wheel boss, the method further comprising: inserting a support structure of the rotor drive key between the first wheel boss and a second wheel boss; and extending the fastener through the support structure and the second wheel boss.

The details of one or more examples are set forth in the accompanying drawings and the description below. Other features, objects, and advantages will be apparent from the description and drawings, and from the claims.

BRIEF DESCRIPTION OF DRAWINGS

FIG. 6A is a schematic front elevation view of an example fastener.

FIG. 6B is a schematic right side view of the example fastener of FIG. 6A.

DETAILED DESCRIPTION

Figure 1:
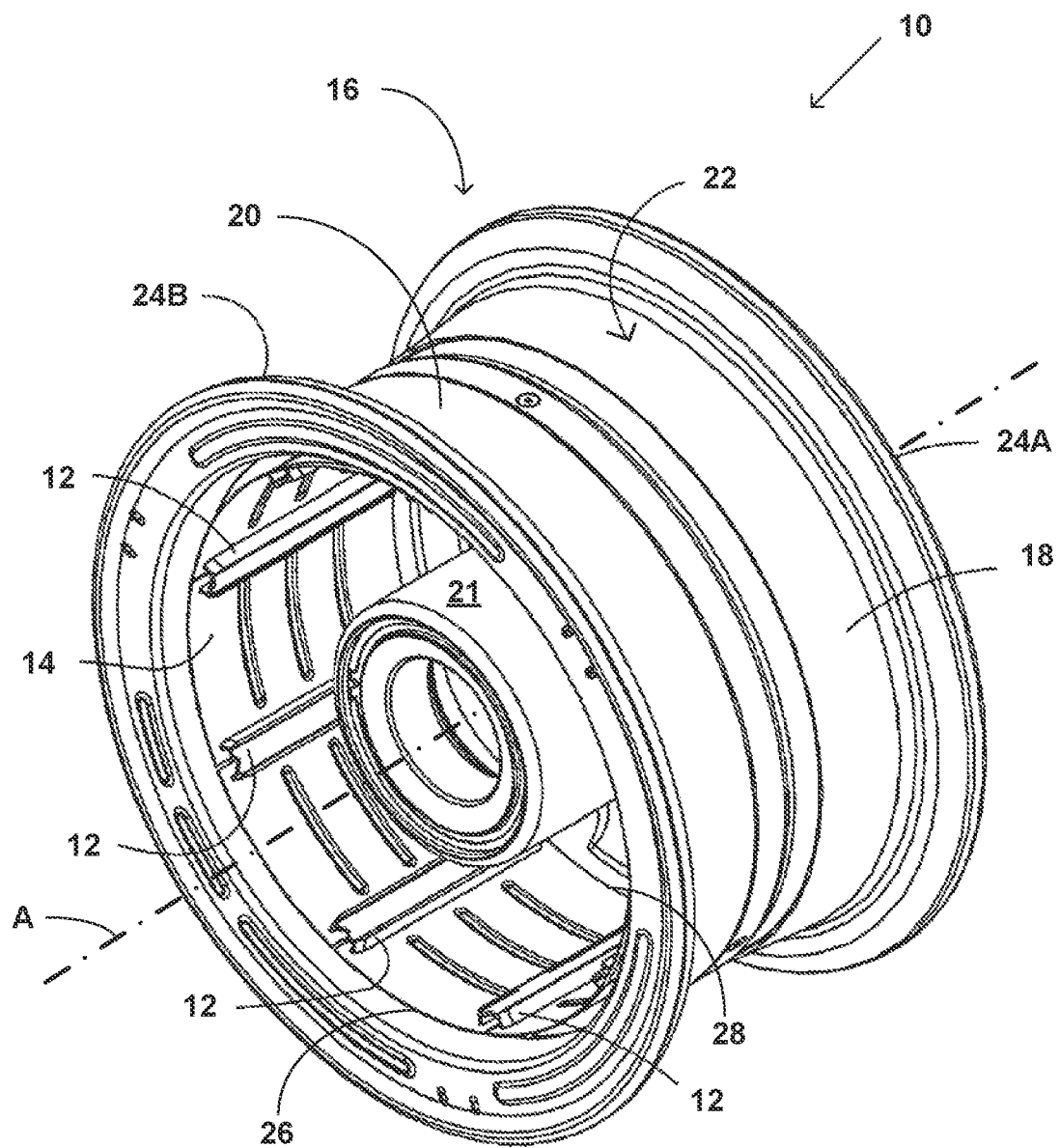
FIG. 1 is a perspective view of an example wheel including a plurality of rotor drive keys on an interior surface of the wheel.

The disclosure describes articles, systems, and techniques relating to rotor drive keys of a wheel brake system of a vehicle, and assemblies for connecting a rotor drive key to a vehicle wheel. The rotor drive keys described herein are configured to be attached to an interior surface of a wheel. The interior surface of the wheel defines at least one wheel boss, and the rotor drive key is configured to position over the wheel boss. The wheel boss may extend in a substantially radial direction (e.g., radial or nearly radial to the extent permitted by manufacturing tolerances) of the wheel, and the rotor drive key may extend in a substantially axial direction (e.g., axial or nearly axial to the extent permitted by manufacturing tolerances) of the wheel when positioned over the wheel boss. A fastener may extend substantially axially through a boss aperture of the wheel boss and engage the rotor drive key. The fastener is configured such that a shank surface of the fastener contacts a key bearing surface of the rotor drive key when the fastener extends through the boss aperture, and the rotor drive key is positioned over the wheel boss. The fastener is configured to limit movement of the rotor drive key relative to the wheel boss. For example, the fastener may be configured to limit movement of the rotor drive key in the substantially radial direction of the wheel relative to the wheel boss.

The fastener comprises a shank defining the shank surface. In some examples, the shank surface may define a cross-section having a varying radial displacement from an axis extending through the fastener shank. For example, some portion of the cross-section may define an off-axis cylinder or oval shape (e.g., while at least another part of the fastener shank may define a circular shape in cross-section), such that when the shank surface contacts the key bearing surface of the rotor drive key and the fastener is rotated around the fastener axis, a contact pressure between the shank surface and the key bearing surface correspondingly varies (e.g., increases or decreases) as a result of the rotation. In some examples, the fastener may be rotated around a fastener axis to increase a contact pressure between the shank surface and the key bearing surface, causing the rotor drive key to engage the fastener and the wheel boss more snugly in the radial direction. The increased contact pressure between the shank surface and the key bearing surface of the rotor drive key helps to secure the rotor drive key against the fastener, and may help engage the rotor drive key with some portion of the wheel boss.

The fastener may be configured to utilize contact pressures among the fastener, one or more wheel bosses, and/or the rotor drive key to limit movement of the fastener during operation and braking of the wheel. The contact pressures among the fastener, one or more wheel bosses, and/or the rotor drive key may act in the absence of thread engagements (e.g., the fastener, wheel bosses, and/or rotor drive key may be an unthreaded components). This may aid in ease of assembly and/or disassembly, and mitigate the potential for thread galling and/or seizing.

In some example, the rotor drive key includes a support structure which defines the key bearing surface the fastener is configured to contact. The key bearing surface is configured to substantially face the shank surface of the fastener when the fastener extends through the wheel boss and the shank surface contacts the key bearing surface. The key bearing surface may define a displacement (e.g., extend) in a substantially axial direction of the wheel when the rotor drive key is positioned over the wheel boss. The support structure may define a bore configured to receive the fastener, and the key bearing surface may be an inner surface of the bore.

The support structure of the rotor drive key may be configured to include a front face and a back face opposite the front face, with the front face configured to engage a surface of the wheel boss for axial stability of the rotor drive key during operation and braking of the wheel. In some examples, the support structure is configured to insert between a first wheel boss and a second wheel boss, and the support structure may be configured such that the front face engages a surface of the first wheel boss and the back face engages a surface of the second wheel boss when the support structure is inserted between the first and second wheel bosses.

In some examples, the rotor drive key includes a trough configured to surround some portion of the wheel boss when the rotor drive key is positioned over the wheel boss. The trough may be configured to substantially conform with the portion of the wheel boss, which may provide radial and tangential stability to the rotor drive key during operation and braking of the wheel, among other advantages.

In some examples, the wheel boss, the rotor drive key, and the fastener may form an assembly in which the shank surface of the fastener contacts the key bearing surface of the rotor drive key, the trough of the rotor drive key at least partially surrounds and contacts the wheel boss, and the front face of the support structure engages a surface of the wheel boss. In examples, a back face of the support structure may engage a second wheel boss. The contact between the shank surface of the fastener and the key bearing surface of the rotor drive key may secure the rotor drive key against substantial movement (or any movement in some examples) in a radial direction of the wheel. The contact between the trough of the rotor drive key and the wheel boss may secure the rotor drive key against substantial movement (or any movement in some examples) in a tangential direction of the wheel. The contact between the front face of the support structure and the wheel boss and/or the back face of the support structure and the second wheel boss may secure the rotor drive key against substantial movement (or any movement in some examples) in an axial direction of the wheel.

As discussed, example rotor drive keys described herein are configured to be attached to the interior surface of a wheel using a fastener that substantially aligns (e.g., aligned or nearly aligned to the extent permitted by manufacturing tolerances) with an axial direction of the wheel. This may provide advantage over arrangements where rotor drive keys are attached to an interior surface of a wheel using fastener such as a bolt which extends substantially in a radial direction of the wheel. For example, a bolt may be configured to be inserted through a first aperture defined by a rotor drive key and a second aperture defined by a rim of a wheel and substantially aligned with the first aperture. The heat cycling, vibration, or other conditions which may occur during rotor drive key use may result in the nut and/or the bolt loosening over time. This may decrease the useful life of the rotor drive key and/or wheel, interrupt the function of the braking assembly for the wheel, increase maintenance costs, result in premature replacement of the rotor drive key, or the like or combinations thereof.

The substantially axial alignment of the fastener in the example rotor drive keys described herein may result in the fastener being less likely to loosen during operation of the wheel or braking system (e.g., due to heat cycling, vibration, or other operating conditions) in comparison to other rotor drive key assemblies that include fasteners extending in a radial direction of the wheel. Further, the fastener includes a shank surface allowing a contact pressure between the rotor drive key and the fastener to be increased as a result of fastener rotation, enhancing the snugness of the fits between the rotor drive key and the wheel boss. As a result, movement of the rotor drive key relative to the wheel during operation of the vehicle including the wheel may be reduced or even prevented.

FIG. 1 is a perspective view illustrating an example wheel 10 including a plurality of rotor drive keys 12 on an interior surface 14 of wheel 10. In some examples, wheel 10 is a part of an aircraft vehicle. In other examples, wheel 10 may be a part of any other vehicle, such as, for example, any marine vessel, land vehicle, or other vehicle. Wheel 10 may include a rim 16 defining an exterior surface 18 and interior surface 14. Rim 16 may include tubewell 20, wheel hub 21, and wheel outrigger flange 22. In some examples, interior surface 14 may include an inner diameter of tubewell 20 of wheel 10. For example, in some cases, interior surface 14 may be referred to as an inner diameter surface of wheel 10.

In some examples, a tire (not shown) may be mounted on exterior surface 18 of rim 16. For example, wheel 10 may include an inboard bead seat 24B and an outboard bead seat 24A configured to retain a tire on exterior surface 18 of rim 16.

Wheel 10 is configured to engage with one or more rotors (not shown in FIG. 1) of a brake assembly. For example, as shown in the example of FIG. 1, a plurality of rotor drive keys 12 are positioned along interior surface 14, and each rotor drive key of the plurality of rotor drive keys 12 may be configured to engage with one or more rotors of a brake disc stack of a brake assembly. An example brake assembly will be described in more detail with respect to FIG. 2.

In some examples, each rotor drive key of the plurality of rotor drive keys 12 extends in a substantially axial direction of wheel 10 (e.g., in a direction parallel to the axis label "A" in FIG. 1, which can be an axis of rotation of wheel 10). For example, a length of each rotor drive key of the plurality of rotor drive keys 12 may extend in the substantially axial (e.g., axial or nearly axial to the extent permitted by manufacturing tolerances) direction of the axis A. In some such examples, the respective length of each rotor drive key 12 may extend from (or near) a first edge 26 of wheel 10 to (or close to) a second edge 28 of wheel 10. In this way, in some examples, a length of a rotor drive key 12 of the plurality of rotor drive keys 12 may be the same or substantially similar to (e.g., within 10%) a width of wheel 10 from first edge 26 to second edge 28. In other examples, a length of a rotor drive key 12 may be less than the width of wheel 10.

The plurality of rotor drive keys 12 extending in the substantially axial direction may enable a brake assembly to slide onto wheel 10. For example, a plurality of rotors of a brake assembly may include drive slots configured to slide onto the plurality of rotor drive keys 12, enabling the plurality of drive slots of the rotors to slide into the plurality of the respective rotor drive keys 12. In other examples, one or more rotor drive keys of the plurality of rotor drive keys 12 may be oriented in a different direction and/or may engage with one or more rotors in a different manner.

The plurality of rotor drive keys 12 may include any suitable number of rotor drive keys. The number of drive keys may be vehicle specific and may depend on, e.g., loads, size of parts, material property, and the like. In some examples, the number of the rotor drive keys included in the plurality of rotor drive keys 12 may correspond to a number of drive slots defined by a plurality of rotors of a brake assembly configured to receive the plurality of rotor drive keys 12. For example, each rotor drive key of the plurality of rotor drive keys 12 may correspond to a respective slot defined by the plurality of rotors of a brake assembly.

As illustrated in the example of FIG. 1, in some examples, the plurality of rotor drive keys 12 may be mounted at substantially equal circumferential distances around interior surface 14 of wheel 10. In other examples, one or more of the plurality of rotor drive keys 12 may be mounted a different circumferential distance from an adjacent rotor drive than at least one other rotor drive key. Here and elsewhere, circumferential distance means the length of an arc (e.g., on the interior surface 14 of wheel 10 where the arc is in a plane perpendicular to the substantially axial direction of wheel 10 in this specific example). Rotor drive keys 12 may be integrally formed with tubewell 20 or may be separate from and mechanically affixed to tubewell 20.

As discussed in further detail below, one or more of the plurality of rotor drive keys 12 defines a key bearing surface configured to engage with a shank surface of a fastener extending axially (along axis A) through a wheel boss extending from interior surface 14 of wheel 10. The key bearing surface may be configured to substantially face the shank surface when the key bearing surface contacts the shank surface. Contact between the shank surface of the fastener and the key bearing surface of the rotor drive key limits movement of the rotor drive key relative to the wheel boss. In some examples, the key bearing surface is configured such that when the fastener extends through the wheel boss, rotation of the fastener around a fastener axis (e.g., which may be parallel to axis A) increases a contact pressure between the shank surface of the fastener and key bearing surface of the rotor drive key. The increased contact pressure may generate a more snug fit between the rotor drive key and one or more wheel bosses extending from interior surface 14 of wheel 10.

Figure 2:
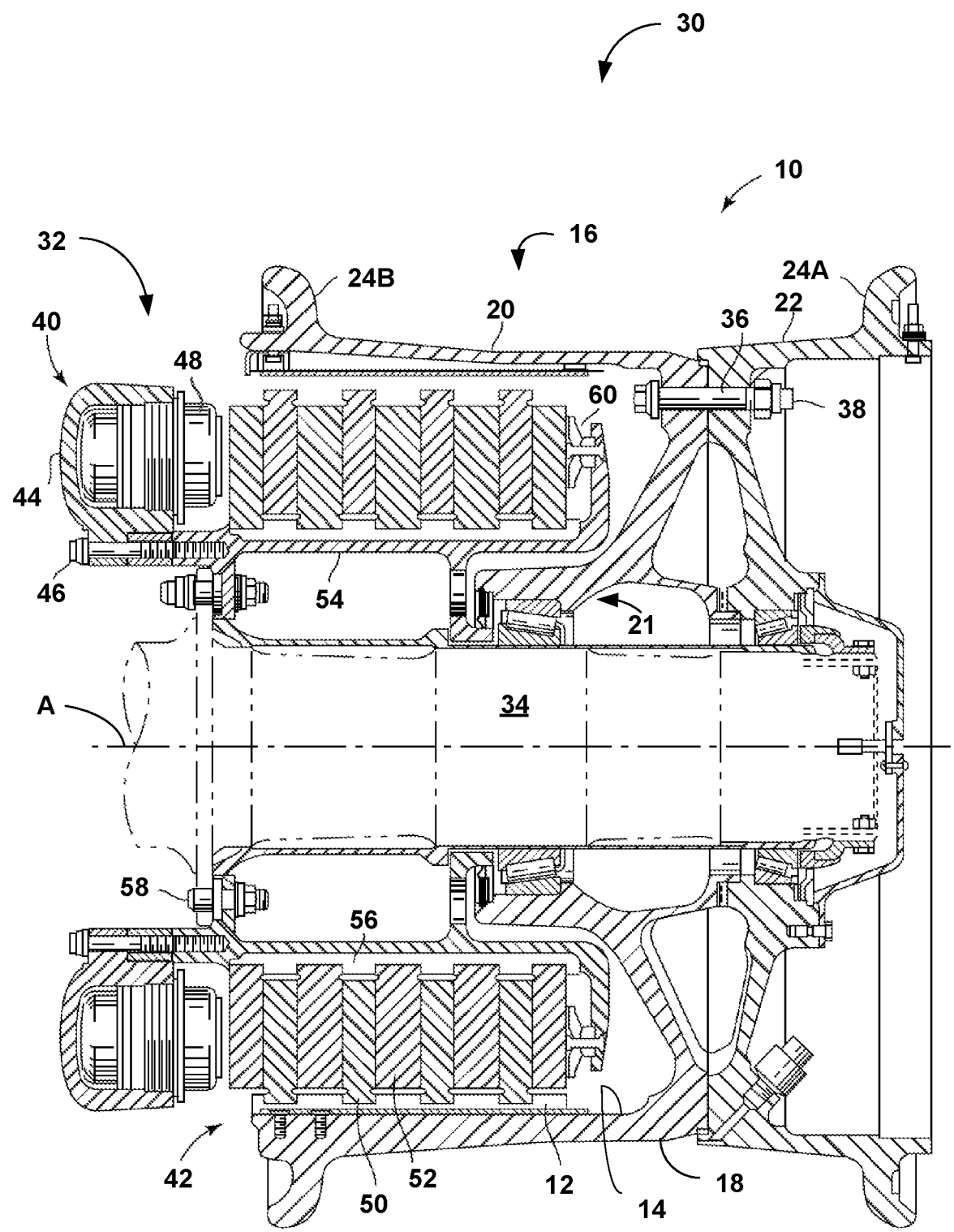
FIG. 2 is a schematic cross-sectional view of an example wheel and brake assembly including the wheel of FIG. 1.

FIG. 2 is a schematic cross-sectional view illustrating an example wheel and brake assembly 30 including an example wheel 10 and a brake assembly 32. Wheel and brake assembly 30 is shown and described to provide context to the example rotor drive key and assemblies including the rotor drive keys and fasteners described herein. The rotor drive keys, fasteners, and other wheel assembly structures described herein, however, may be used with any suitable wheel and brake assembly in other examples.

Wheel 10 includes plurality of rotor drive keys 12, interior surface 14, rim 16, exterior surface 18, tubewell 20, wheel hub 21, wheel outrigger flange 22, outboard bead seat 24A, and inboard bead seat 24B. Wheel 10 may be configured to be rotatably carried on fixed axle 34. In turn, wheel 10 may impart motion to a vehicle including or mounted on the wheel and brake assembly 30. In the example shown in FIG. 2, tubewell 20 and wheel outrigger flange 22 are mechanically coupled by lug bolt 36 and lug nut 38. Other connection techniques may be used in other examples.

Brake assembly 32 includes an actuator assembly 40 and a brake stack 42. Actuator assembly 40 includes actuator housing 44, actuator housing bolt 46, and ram 48. Brake stack 42 includes interleaved rotor brake discs 50 and stator brake discs 52. Rotor brake discs 50 are configured to move relative to stator brake discs 52, e.g., rotationally about axis A and axially along axis A relative to stator brake discs 52. Rotor brake discs 50 are engaged (e.g., interface) with wheel 10, and in particular tubewell 20, by rotor drive keys 12. Stator brake discs 52 are mounted to torque tube 54 by splines 56. Wheel and brake assembly 30 may support any variety of private, commercial, or military aircraft or other type of vehicle.

Wheel and brake assembly 30 may be mounted to a vehicle via torque tube 54 and axle 34. In the example of FIG. 2, torque tube 54 is affixed to axle 34 by a plurality of bolts 58. Torque tube 54 supports actuator assembly 40 and stator brake discs 52. Axle 34 may be mounted on a strut of a landing gear (not shown) or other suitable component of the vehicle to connect wheel and brake assembly 30 to the vehicle.

During operation of the vehicle, braking may be necessary from time to time, such as during landing and taxiing procedures of an aircraft. Wheel and brake assembly 30 is configured to provide a braking function to the vehicle via actuator assembly 40 and brake stack 42. Actuator assembly 40 includes actuator housing 44 and ram 48. Actuator assembly 40 may include different types of actuators such as one or more of, e.g., an electrical-mechanical actuator, a hydraulic actuator, a pneumatic actuator, or the like. During operation, ram 48 may extend away from actuator housing 44 to axially compress brake stack 42 against compression region 60 for braking. Brake stack 42 includes interleaved rotor brake discs 50 and stator brake discs 52.

Rotor brake discs 50 are slidably engaged with rotor drive keys 12 for common rotation with tubewell 20 and rotor drive keys 12. Stator brake discs 52 are mounted to torque tube 54 by splines 56. In the example of FIG. 2, brake stack 42 includes four rotors and five stators. However, a different number of rotors and/or stators may be included in brake stack 42 in other examples. Rotor brake discs 50 and stator brake discs 52 may provide opposing friction surfaces for braking an aircraft. In some examples, wheel and brake assembly 30 may include a thermal barrier between rotor brake discs 50 and tubewell 20 in order to, for example, limit thermal transfer between brake stack 42 and wheel 10.

In some examples, splines 56 may be circumferentially spaced about an outer portion of torque tube 54. Stator brake discs 52 may include a plurality of radially inwardly disposed lug notches along an inner diameter of the brake disc configured to engage with splines 56. Similarly, rotor brake discs 50 may include a plurality of radially inwardly disposed drive slots along an outer periphery (e.g., an outer diameter in the case of a disc having a circular cross-section) of the rotor brake disc. The drive slots may be configured to engage with rotor drive keys 12. As such, rotor brake discs 50 will rotate with the motion of wheel 10 while stator brake discs 52 remain stationary, allowing the friction surfaces of an adjacent stator brake discs 52 and rotor brake discs 50 to engage with one another to deaccelerate the rotation of wheel 10.

Figure 3:
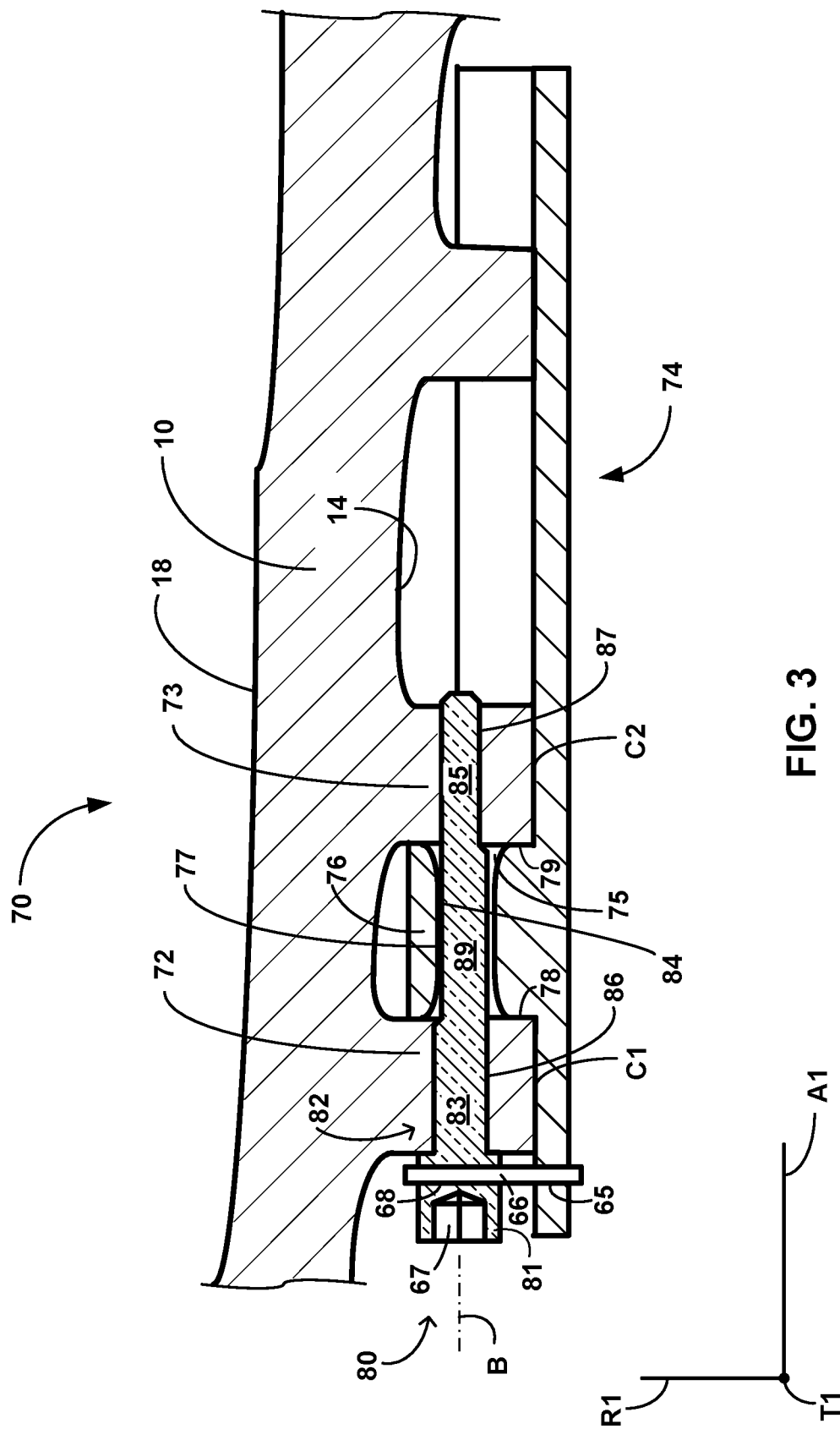
FIG. 3 is a plan view with selected cross-sections of an example assembly including a rotor drive key on an interior surface of a wheel.
Figure 4:
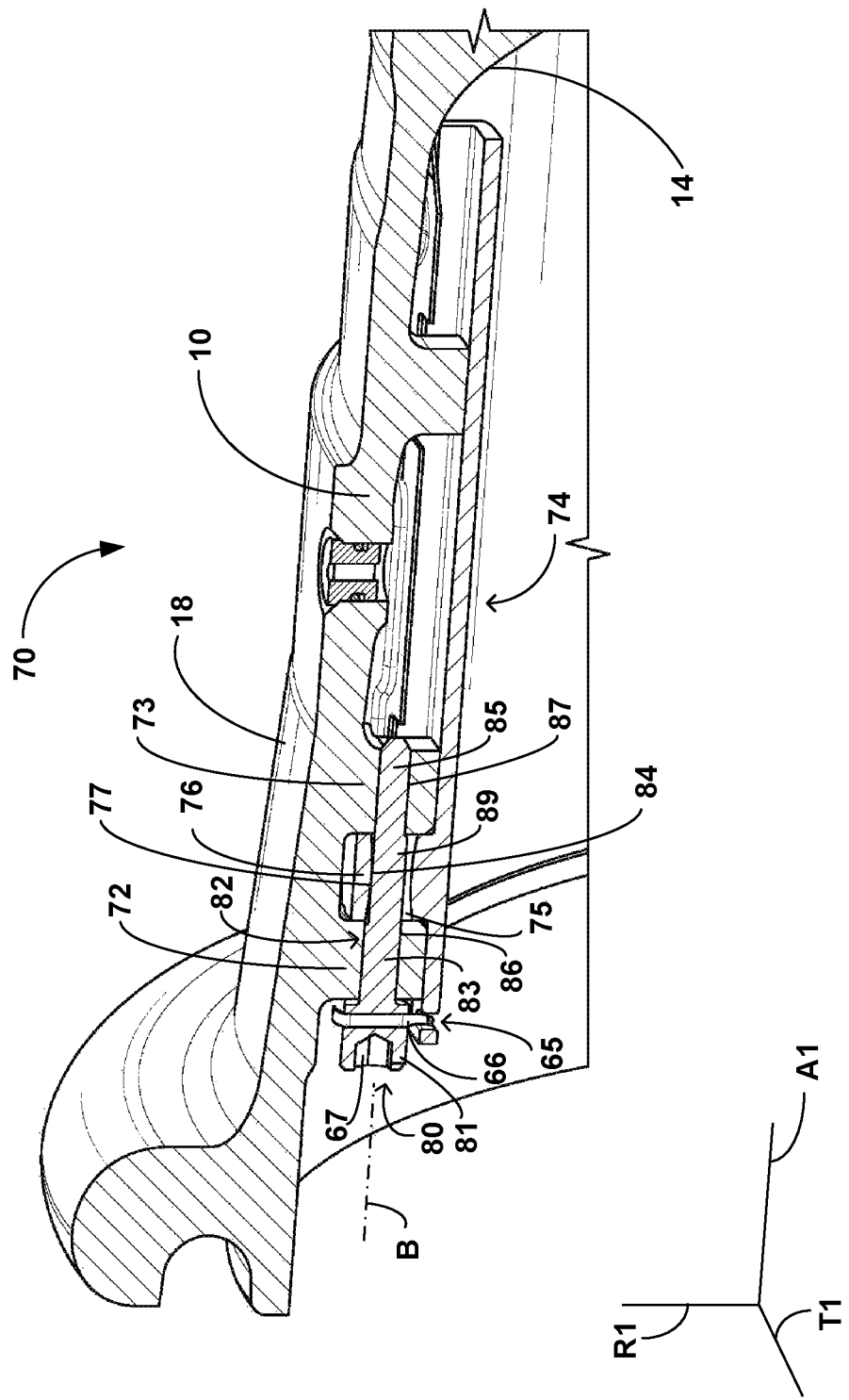
FIG. 4 is a perspective view of an example rotor drive key and fastener on an interior surface of a wheel.

FIG. 3 illustrates an example assembly 70 and depicts a cross-section of an example wheel 10 defining exterior surface 18 and interior surface 14, the cross-section being taken parallel to axial direction A in FIG. 1. FIG. 4 is an example perspective view of wheel 10 and assembly 70 of FIG. 3. A line A1 is coincident with the axis of rotation A of wheel 10 (FIGS. 1 and 2) and illustrates the axial direction of wheel 10. A line R1 is perpendicular to and intersects the line A1 and indicates a radial direction of wheel 10. A line T1 is perpendicular to both line A1 and line R1 and indicates a tangential direction of wheel 10. Lines A1, R1, and T1 are illustrated at both FIG. 3 and FIG. 4, with line T1 perpendicular to the page in FIG. 3. Assembly 70 is an example of wheel and brake assembly 30 of FIG. 2.

Assembly 70 comprises a wheel boss 72 of wheel 10, a rotor drive key 74, and a fastener 80. As shown in FIG. 3, rotor drive key 74 is configured to be positioned over wheel boss 72. Rotor drive key 74 is an example of rotor drive key 12 of FIGS. 1 and 2. Wheel boss 72 protrudes from interior surface 14 in a generally radial direction R1 of wheel 10, and rotor drive key 74 extends in a substantially axial direction A1 of wheel 10 when rotor drive key 74 is positioned over wheel boss 72.

Fastener 80 is configured to extend through wheel boss 72. Fastener 80 comprises fastener head 81, fastener shank 82 and shank surface 84. Fastener axis B extends through fastener head 81 and fastener shank 82 and can be, for example, a central longitudinal axis of fastener shank 82. A proximal portion 83 of fastener shank 82 ("shank proximal portion 83") is between medial portion 89 of fastener shank 82 ("shank medial portion 89") and fastener head 81. Shank medial portion 89 is between a distal portion 85 of fastener shank 82 ("shank distal portion 85") and shank proximal portion 83. Shank medial portion 89 includes shank surface 84. In some examples, portions 83, 85, 89 have substantially equal lengths (e.g., equal or nearly equal to the extent permitted by manufacturing tolerance). In other examples, at least two portions 83, 85, 89 have different lengths. In some examples, a fastener axis extends through shank proximal portion 83, shank medial portion 89, and shank distal portion 85.

Fastener 80 may be configured such that at least some portion of shank surface 84 contacts and/or faces a key bearing surface 77 of rotor drive key 74 when fastener 80 extends through wheel boss 72. Fastener 80 is configured to limit movement of rotor drive key 74 relative to wheel boss 72 and, therefore, is configured to help connect rotor drive key 74 to wheel boss 72. For example, fastener 80 may be configured to limit movement of rotor drive key 74 in at least the substantially radial direction R1 of wheel 10 relative to wheel boss 72. In some examples, fastener 80 is configured to extend through wheel boss 72 and into a second wheel boss 73 of wheel 10, which can be configured like wheel boss 72, but is axially displaced from wheel boss 72.

Fastener 80 may be configured such that shank surface 84 contacts and/or faces key bearing surface 77 when fastener 80 extends through at least wheel boss 72 and an external torque around fastener axis B is applied to fastener 80 (e.g., applied to fastener head 81). In an example, when a portion of shank surface 84 faces key bearing surface 77, a vector originates from the portion of shank surface 84 and intersects key bearing surface 77 without passing through the portion of shank surface 84, and a negative of the vector originates from key bearing surface 77 and intersects the portion of shank surface 84 without passing through key bearing surface 77.

Key bearing surface 77 of rotor drive key 74 may substantially extend in at least an axial direction A1 of wheel 10 when rotor drive key 74 is positioned over wheel boss 72. Fastener 80 may be configured to slidably translate through wheel boss 72 in an axial direction A1 of wheel 10. Wheel boss 72 limits movement of fastener 80 in at least the radial R1 and tangential T1 directions of wheel 10 when fastener 80 extends through wheel boss 72. In some examples, wheel boss 72 defines boss aperture 86, through which fastener 80 is configured to extend.

When fastener 80 extends through wheel boss 72 and shank surface 84 contacts and/or faces key bearing surface 77, shank surface 84 may limit movement of rotor drive key 74 relative to wheel 10 at least in a radial direction R1 of wheel 10. Fastener 80 may be configured such that, when fastener 80 is inserted through wheel boss 72 in an axial direction A1 of wheel 10, rotation of fastener 80 around fastener axis B establishes and/or maintains contact and/or the facing relationship between shank surface 84 and key bearing surface 77. In some examples, shank surface 84 may be configured such that rotation of fastener 80 around fastener axis B in a first direction increases a contact pressure between shank surface 84 and key bearing surface 77 (e.g., increases a force exerted by shank surface 84 on key bearing surface 77). The contact pressure between shank surface 84 and rotor drive key 74 may anchor rotor drive key 74 to wheel boss 72 and enables rotor drive key 74 to cantilever in a substantially axial direction A1 of wheel 10.

Shank surface 84 may be configured such that the contact pressure is dependent on a rotational position of fastener 80 relative to key bearing surface 77. For example, shank surface 84 may be configured as a cam surface having a displacement perpendicular to faster axis B (e.g., a cam lift), with the displacement varying over the shank surface 84 based on an angular position around the fastener axis B (e.g., displacement D of FIG. 6B). Shank surface 84 may define a radial cam profile around fastener axis B. Key bearing surface 77 may be configured to substantially act as a follower (e.g., a flat follower) when shank surface 84 contacts key bearing surface 77, such that shank surface 84 acts to displace and/or compress (or compress against) key bearing surface 77 as fastener 80 rotates (e.g., is rotated by an operator) around fastener axis B. The displacement and/or compression may act to alter (e.g., increase or decrease) the contact pressure between shank surface 84 and key bearing surface 77.

Thus, fastener 80 is configured such that, when fastener 80 is inserted through wheel boss 72 in an axial direction A1 of wheel 10, rotation of fastener 80 around fastener axis B establishes and/or maintains contact and/or the facing relationship between shank surface 84 and key bearing surface 77. Rotation of fastener 80 around fastener axis B increases the contact pressure as shank surface 84 acts to displace and/or compress (or compress against) key bearing surface 77. The increased contact pressure generates an increased force between shank surface 84 and key bearing surface 77, causing the rotor drive key 74 to snug more firmly against wheel 10.

Figure 5:
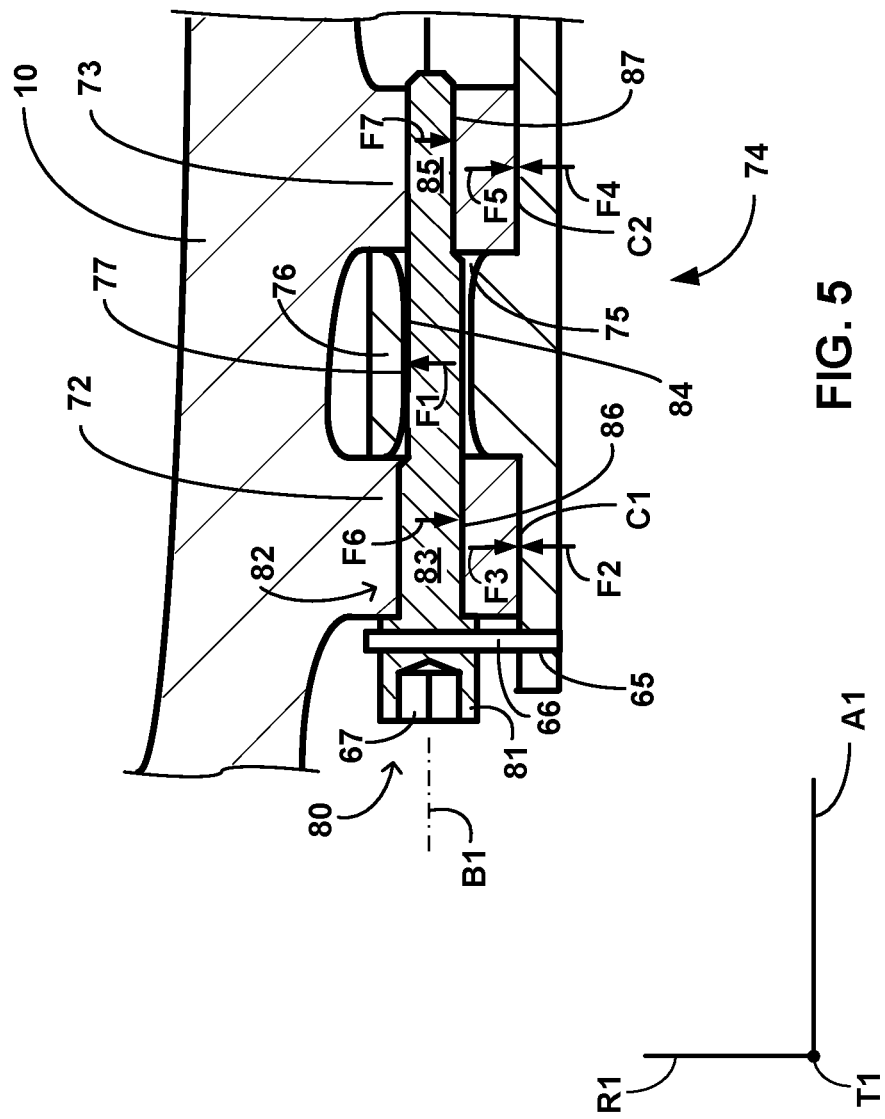
FIG. 5 is a plan view with selected cross-sections of an example assembly including contact areas between a rotor drive key and a wheel boss.

For example, FIG. 5 illustrates a portion of wheel 10 and rotor drive key 74, with fastener 80 extending axially through wheel boss 72. Shank surface 84 is in contact with key bearing surface 77 of rotor drive key 74. Shank surface 84 is configured such that rotation of fastener 80 around fastener axis B1 increases a force F1 imparted by shank surface 84 onto key bearing surface 77. For example, shank surface 84 may be configured such that rotation of fastener 80 pushes rotor drive key 74 toward wheel 10, or otherwise acts to increase a contact pressure between shank surface 84 and key bearing surface 77. The force F1 may be in a radial direction R1 of wheel 10 and may be substantially perpendicular to fastener axis B1.

The force F1 may transmit to other portions of rotor drive key 74, and cause rotor drive key 74 to more effectively engage (e.g., snug against), for example, wheel boss 72 and/or wheel boss 73. For example, the increased F1 may increase a radially-directed force F2 imparted by rotor drive key 74 on wheel boss 72 at contact area C1. Wheel boss 72 will respond by imparting an equal and opposing force F3 on rotor drive key 74. The forces F1 and F3—generated by the contact pressure between shank surface 84 and key bearing surface 77—may act to effectively trap rotor drive key 74 against movements in the radial direction R1 of wheel 10. Rotor drive key 74 may be configured to position over additional wheel bosses such as wheel boss 73, and the increased contact pressure and increased force F1 may increase a radially-directed force F4 imparted by rotor drive key 74 against wheel boss 73 at contact area C2 in the same manner. The reaction force F5 in conjunction with the force F1 may further secure rotor drive key 74 against movements in the radial direction of wheel 10.

The increased force F1 generated by rotation of fastener 80 around fastener axis B1 may also transmit to other portions of fastener 80, causing fastener 80 to more effectively engage (e.g., snug against), for example, boss aperture 86 defined by wheel boss 72. The increased force F1 may increase a radially-directed force F6 imparted by shank proximal portion 83 on an interior surface of boss aperture 86. The interior surface of wheel boss 72 defining boss aperture 86 will respond by imparting an equal and opposing reaction force on shank proximal portion 83.

In some examples in which fastener 80 extends through boss aperture 87 of wheel boss 73, the increased force F1 may cause fastener 80 to more effectively engage (e.g., snug against) boss aperture 87 defined by wheel boss 73. For example, shank distal portion 85 may impart a radially-directed force F7 on an interior surface of wheel boss 73 defining boss aperture 87, with the surface of interior surface of wheel boss 73 defining boss aperture 87 imparting an equal and opposing reaction force on shank distal portion 85.

Rotor drive key 74 may include one or more additional bearing surfaces configured similarly to key bearing surface 77. In examples, the one or more additional bearing surfaces may be configured such that wheel boss 73 substantially separates key bearing surface 77 and the one or more additional bearing surfaces when rotor drive key 74 is positioned on wheel 70. In some examples, the one or more additional shank sections may be configured such that wheel boss 73 is between shank medial portion 89 and the one or more additional shank sections when rotor drive key 74 is positioned on wheel 70. Fastener 80 may be configured such that at least one of the one or more additional shank sections engage an at least one of the additional surfaces of rotor drive key 74 when fastener 80 extends through structure support slot 75 and fastener 80 is rotated around fastener axis B1.

Returning to FIG. 3, in some examples, fastener 80 is configured such that an operator may rotate fastener head 81 to generate the rotation of fastener 80 around fastener axis B in order to establish and/or maintain contact between shank surface 84 and key bearing surface 77. In examples, fastener head 81 may be provided with a recess (e.g., a socket drive) to facilitate rotation of fastener 80, or for some other reason. For example, FIGS. 3-5 illustrates fastener head 81 defining socket drive 67. Fastener head 81 may be configured to substantially maintain a particular rotational position relative to rotor drive key 74. For example, fastener head 81 may be configured to maintain a rotational position whereby shank surface 84 remains in contact with key bearing surface 77, such that fastener 80 provides support to rotor drive key 74 in at least a radial direction R1 of wheel 10.

Rotation of fastener 80 around fastener axis B may be facilitated by an operator using, for example, a torqueing tool (e.g., a wrench) configured to substantially mate with socket drive 67. Socket drive 67 may include any suitable shape, including regular polygonal shapes (e.g., hexagon), irregular polygonal shapes, star-patterns, and others. Fastener axis B may extend through at least some portion of socket drive 67, such socket drive 67 may be rotated around fastener axis B to drive rotation of fastener 80 around fastener axis B.

Although illustrated as a recess in FIGS. 3-5, in other examples, socket drive 67 may be configured as a protrusion extending from fastener head 81 in a direction away from shank proximal portion 83. The protrusion may be configured to insert into a recess of a torqueing tool or component thereof, and may be configured to include any shape, including regular polygonal shapes (e.g., hexagon), irregular polygonal shapes, star-patterns, and others.

In some examples, a retainer can be used to substantially secure fastener 80 in a particular rotational position, relative to rotor drive key 74. For example, as shown in FIGS. 3-5, a retaining pin 66 may be positioned to extend through some portion of fastener 80 (such as fastener head 81) in order to substantially secure fastener 80 in a particular rotational position, relative to rotor drive key 74. Retaining pin 66 may insert into and/or extend through a key pin access 65 defined by rotor drive key 74. Retaining pin 66 is configured such that, when fastener 80 extends through support structure slot 75 of rotor drive key 74 and retaining pin 66 extends through fastener head 81 and into key pin access 65, retaining pin 66 substantially prevents rotation of fastener 80 around fastener axis B, relative to rotor drive key 74. Thus retaining pin 66 may assist in maintaining fastener 80 in a rotational position whereby a force similar to F1 generates forces similar to F2 and F3 and/or F4 and F5 to substantially secure rotor drive key 74 to wheel 10, and may assist in substantially securing fastener 80 against movement in an axial direction A1 of wheel 10.

Retaining pin 66 may be configured to be removed by withdrawal of retaining pin 66 from fastener head 81 and key pin access 65 as a unitary piece, and/or may be configured to allow cutting retaining pin 66 in two or more pieces before removal. The removal of retaining pin 66 may further aid in disassembly and rotation of fastener 80 to decrease and/or remove the contact pressure on key bearing surface 77 so that fastener 80 may be more easily withdrawn. In other examples, other components or combinations of components configured to substantially prevents rotation of fastener 80 around fastener axis B may be utilized.

In some examples, as shown in FIG. 3, rotor drive key 74 includes a support structure 76 which defines key bearing surface 77. Support structure 76 defines a slot 75 ("support structure slot 75") configured to receive fastener 80 when rotor drive key 74 is positioned over wheel boss 72 and fastener 80 extends in an axial direction through wheel boss 72. Support structure slot 75 may be configured to surround or partially surround fastener 80. In some examples, key bearing surface 77 comprises a surface of support structure slot 75. Support structure slot 75 may be configured such that when fastener 80 inserts into support structure slot 75, key bearing surface 77 substantially faces shank surface 84 of fastener 80.

Support structure 76 may comprise a front face 78 configured to contact wheel boss 72 when shank surface 84 contacts key bearing surface 77. Contact between front face 78 and wheel boss 72 may act to limit movement of rotor drive key 74 in an axial direction A1, relative to wheel boss 72. In some examples, support structure 76 is configured to insert between wheel boss 72 and a second wheel boss 73 that is adjacent to wheel boss 72. Support structure 76 may comprise a back face 79 configured to contact wheel boss 73 when shank surface 84 contacts key bearing surface 77. Thus, wheel bosses 72, 73 can define a gap configured to receive support structure 76 of rotor drive key 74.

When fastener 80 extends at least through wheel boss 72 (e.g., through boss aperture 86 defined by wheel boss 72) and support structure 76 of rotor drive key 74, rotor drive key 74 may be anchored by the action of fastener 80 and/or wheel boss 72 and cantilevered in a substantially axial direction A1 of wheel 10. This may enable one or more bolts oriented along a radial wheel axis or perpendicular to a length of a rotor drive key to be eliminated from the assembly. Bolts oriented along a radial wheel axis or otherwise perpendicular to a length of a rotor drive key may be more difficult to install than the substantially axially extending fasteners described herein, e.g., may require a special right angle tool to install the bolt. Further, bolts oriented along a radial wheel axis or otherwise perpendicular to a length of a rotor drive key may be more likely to become unattached to interior surface 14 of wheel 10 compared to the axially oriented fastener 80 described herein. For instance, heat cycling, vibration, or the like may result in the bolt becoming loose or even completely unattached to the rotor drive key and the wheel assembly. In addition, there may not be sufficient radial clearance in the wheel assembly for a nut or other retaining mechanism to be used with a bolt that extends in the radial direction. Loosening of the bolt may cause the rotor drive key to be unsecured to wheel 10, which may decrease the useful life of the rotor drive key and/or wheel, and interrupt the function of the brake assembly for the wheel, increase maintenance costs, result in premature replacement of the rotor drive key, or the like.

In addition, in contrast to rotor drive key 74 and other rotor drive keys described herein, some rotor drive keys may not include one or more surfaces (such as front face 78 and/or back face 79 (FIG. 3)) configured to face a wheel boss and oppose movement of the rotor drive key in the axial direction A1. Thus, in some such examples, the rotor drive keys (that do not include a surface configured to face a wheel boss) may be subject to increased movement, as the assembly does not include features configured to engage in the substantially axial direction. Moreover, in contrast to assemblies described herein, in situations in which the bolt loosens or disengages, the rotor drive keys (that do not include a surface configured to face a wheel boss) of such other assemblies may not include any other mechanism or point of engagement configured to help maintain the rotor drive key in an intended position on the interior surface of the wheel.

Figure 7A:
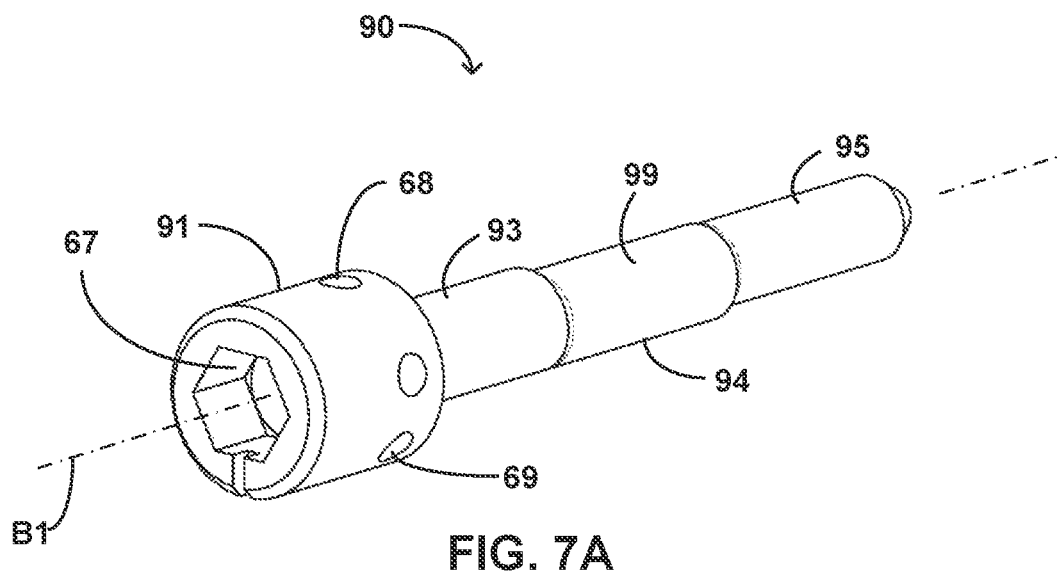
FIG. 7A is a perspective view of the example fastener of FIG. 6A and FIG. 6B.
Figure 7B:
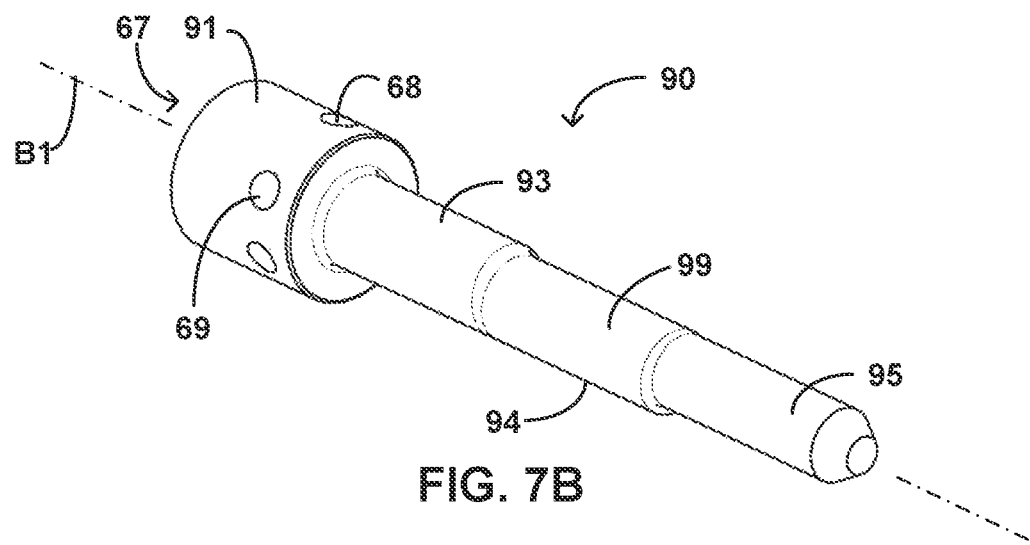
FIG. 7B is another perspective view of the example fastener of FIG. 7A.

As discussed, in some examples, fastener 80 is configured to increase or decreases a contact pressure with key bearing surface 77 in a substantially smooth, continuous manner as fastener 80 rotates in a particular rotary direction around fastener axis B. Shank surface 84 may substantially define a radial cam profile configured to generate a particular amount of contact pressure between shank surface 84 and key bearing surface 77 based on a specific rotary position of fastener 80 relative to key bearing surface 77. As an example, FIG. 6A and FIG. 6B illustrate schematic plan views of an example fastener 90, with FIGS. 7A and 7B illustrating perspective views of fastener 90. Fastener 90 may be an example of fastener 80 (FIG. 3-5). Fastener 90 is configured such that, when fastener 90 is inserted through wheel boss 72 in an axial direction A1 of wheel 10, rotation of fastener 90 establishes contact and/or increases a contact pressure between shank surface 94 and key bearing surface 77.

Fastener 90 includes fastener shank 92, shank surface 94, and fastener head 91. Fastener axis B1 extends through fastener head 91 and fastener shank 92, e.g., through a center of fastener head 91. A proximal portion 93 of shank 92 ("shank proximal portion 93") is between a medial portion 99 of fastener shank 92 ("shank medial portion 99") and fastener head 91. Shank medial portion 99 is between a distal portion 95 of shank 92 ("shank distal portion 95") and shank proximal portion 93. Fastener head 91 may be an example of fastener head 81 (FIGS. 3-5), fastener shank 92 may be an example of fastener shank 82 (FIGS. 3-5), shank proximal portion 93 may be an example of shank proximal portion 83 (FIGS. 3-5), shank medial portion 99 may be an example of shank medial portion 89 (FIGS. 3-5), shank distal portion 95 may be an example of shank distal portion 85 (FIGS. 3-5), and shank surface 94 may be an example of shank surface 84 (FIGS. 3-5).

Fastener 90 is configured such that at least a portion of shank surface 94 faces and/or contacts support structure 76 of rotor drive key 74 when fastener 90 is inserted through support structure slot 75 defined by rotor drive key 74 (FIGS. 3-5). When fastener 90 is inserted through wheel boss 72 in an axial direction A1 of wheel 10, rotation of fastener 90 around a fastener axis B1 may establish and/or maintain contact between shank surface 94 and key bearing surface 77. Fastener 90 may be configured such that, when fastener 90 is inserted through wheel boss 72 in an axial direction A1 of wheel 10, rotation of fastener 90 around a fastener axis B1 increases a contact pressure between shank surface 94 and key bearing surface 77 of rotor drive key 74.

The increased contact pressure between shank surface 84 and key bearing surface 77 may cause rotor drive key 74 to more effectively engage (e.g., snug against) wheel boss 72 and/or wheel boss 73, and may cause fastener 90 to more effectively engage (e.g., snug against) boss aperture 86 of wheel boss 72 and/or boss aperture 87 of wheel boss 73 (FIG. 3).

As illustrated in FIGS. 6A, 6B, 7A, and 7B, in some examples, shank surface 94 may be configured as a cam surface relative to fastener axis B1, such that a displacement D (e.g., a radius) from fastener axis B1 to shank surface 94 varies as an endpoint (e.g., the arrow at FIG. 6B) of the displacement D rotates around fastener axis B1 as the other endpoint remains fixed on fastener axis B1. For example, the displacement of shank surface 94 may vary from a minimum displacement D1 to a maximum displacement D2. Displacement D may be measured perpendicular to the fastener axis B1. Due to this configuration of shank surface 94, shank medial portion 99 of fastener 90 may be asymmetrical relative to fastener axis B1. Shank surface 94 may be a surface of a cylinder having an axis offset from fastener axis B1. Shank surface 94 may be a non-circular (e.g., oval shaped or nearly oval shaped) surface (in cross-section, the cross-section being taken orthogonal to fastener axis B1) surrounding some portion of the fastener axis B1. As a result, shank surface 94 may be placed adjacent to a surface (such as key bearing surface 77 (FIG. 3)) having some portion on the plane P1, such that rotation of fastener 90 about fastener axis B1 maintains or brings shank surface 94 into contact with the surface (such as key bearing surface 77).

Fastener 90 may be configured such that, when fastener 90 is inserted within boss aperture 86 and/or support structure slot 75 of rotor drive key 74 (FIG. 3), some portion of key bearing surface 77 may reside on plane P1, and rotation of fastener 90 establishes or maintains contact between shank surface 94 and key bearing surface 77. The contact between shank surface 94 and key bearing surface 77 may establish a contact pressure and cause shank surface 94 to exert a force in a direction substantially perpendicular to fastener axis B1 onto key bearing surface 77. Further rotation of fastener 90 about fastener axis B1 may increase the contact pressure between shank surface 94 and key bearing surface 77 as some portion of shank surface 94 urges key bearing surface 77 to displace (e.g., to experience cam lift) in a radial direction R1 of wheel 10 (FIG. 3-5). Some portion of shank surface 94 and/or key bearing surface 77 may elastically deform (e.g., flex) as the contact pressure increases. The increased contact pressure between shank surface 94 and key bearing surface 77 may generate a force such as F1 (FIG. 5) on key bearing surface 77, and generate one or more forces such as F2, F3, F4, and F5 (FIG. 5) between rotor drive key 74 and wheel 10, and/or forces F6 and F7 (FIG. 5) between fastener 90 and wheel 10.

Figure 8C:
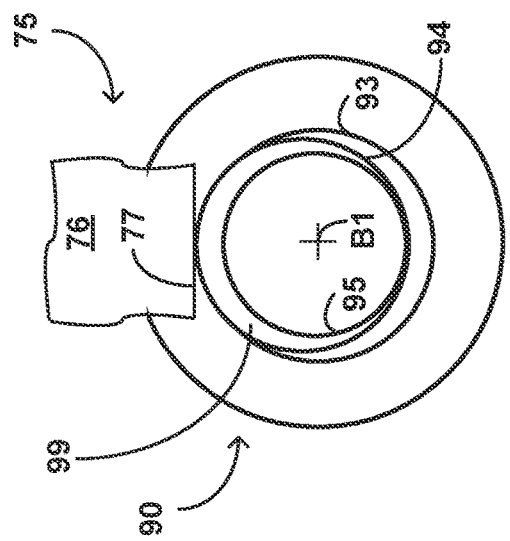
FIG. 8C is schematic illustration of the example fastener of FIGS. 8A and 8B in a third rotational orientation.
Figure 8B:
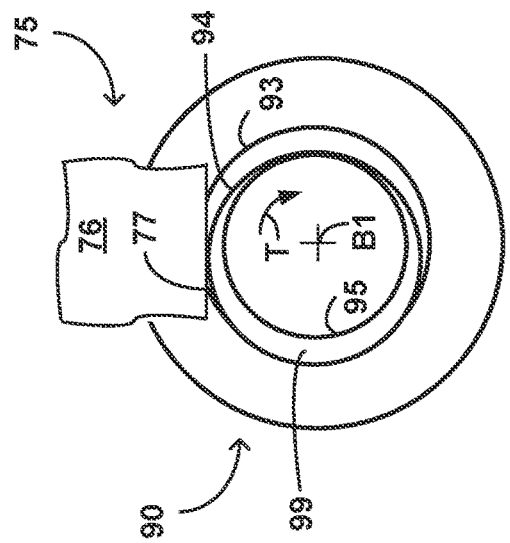
FIG. 8B is schematic illustration of the example fastener of FIG. 8A in a second rotational orientation.
Figure 8A:
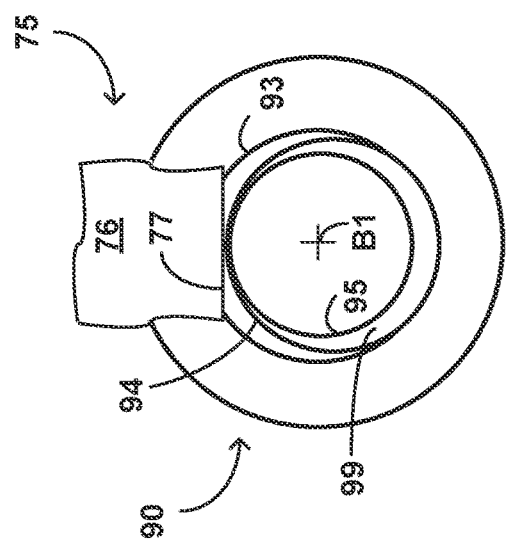
FIG. 8A is schematic illustration of an example fastener in a first rotational orientation.

FIGS. 8A-8C illustrate conceptual end elevations of fastener 90 extending into support structure slot 75 defined by a section of support structure 76 of rotor drive key 74. FIGS. 8A-8C illustrate different rotational positions of fastener 90 about fastener axis B1. Shank surface 94 defines a cam surface relative to fastener axis B1, such that a displacement from fastener axis B1 to shank surface 94 varies around fastener axis B1. Thus, shank medial portion 99 (FIGS. 7A and 7B) of fastener 90 may be asymmetrical relative to fastener axis B1 in some examples.

In FIG. 8A, fastener 90 is inserted within support structure slot 75 in an axial direction A1 of wheel 10 such that a portion of shank surface 95 having a relatively low displacement from fastener axis B1 (e.g., D1 (FIG. 6A)) contacts or is in close proximity to key bearing surface 77. Shank surface 95 may be displaced from key bearing surface 77 (e.g., not in contact with) or may be in contact with key bearing surface 97. When shank surface 95 is in contact with key bearing surface 77, shank surface 95 may exert a contact pressure on key bearing surface 77 and generate a force such as F1 (FIG. 5) on key bearing surface 77. Substantially aligning fastener 90 with support structure slot 75 such that the portion of shank surface 95 having the relatively low displacement from fastener axis B1 (e.g., D1 (FIG. 6A)) contacts or is in relatively closest proximity to key bearing surface 77 relative to other portions of shank surface 95 may aid in the insertion of fastener 90 into support structure slot 75 during assembly, or aid the withdrawal of fastener 90 from support structure 75 during disassembly. In some examples, fastener 90 may provide a visual indicator to serve as an indicator of the relative rotational orientation of the portion of shank surface 95 (about fastener axis B1) having the relatively low displacement when, for example, shank surface 99 may not be visible to an operator during an installation or removal of fastener 90. For example, pin access 68 (FIG. 6A, 6B, 7A, 7B) or another pin access may serve as a visual indicator of the relative rotational orientation.

FIG. 8B illustrates fastener 90 after it is rotated (from the position shown in FIG. 8A) in the direction of torque T relative to the section of support structure 76 and about axis B1. The torque T may be applied via fastener head 91 (FIG. 6A, 6B, 7A, 7B). Fastener 90 has rotated such that a section of shank surface 99 having a greater displacement (e.g., greater than D1 (FIG. 6A)) from fastener axis B1 is in contact with key bearing surface 77. The greater displacement establishes and/or increases the contact pressure between shank surface 94 and key bearing surface 77, relative to the configuration of FIG. 8A. The increased contact pressure between shank surface 94 and key bearing surface 77 in the orientation of FIG. 8B may cause a displacement of key bearing surface 77 in a radial direction R1, and/or may cause a compression of shank surface 94 and/or key bearing surface 77. The increased contact pressure between shank surface 94 and key bearing surface 77 may generate a force such as F1 (FIG. 5) on key bearing surface 77, and may generate one or more forces such as F2, F3, F4, and F5 (FIG. 5) between rotor drive key 74 and wheel 10, and/or forces F6 and F7 (FIG. 5) between fastener 90 and wheel 10. One or more of the forces F1, F2, F3, F4, F5, F6, and/or F7 cause rotor drive key 74 to more effectively engage (e.g., snug against) wheel boss 72 and/or wheel boss 73, and may cause fastener 90 to more effectively engage (e.g., snug against) boss aperture 86 of wheel boss 72 and/or boss aperture 87 of wheel boss 73 (FIG. 3).

FIG. 8C illustrates fastener 90 after it is rotated (relative to the rotational position shown in FIG. 8A) farther in the direction of torque T relative to the section of support structure 76 and about axis B1. Fastener 90 has rotated such that a section of shank surface 95 having a greater displacement relative to fastener axis B1 than that depicted in FIG. 8B (e.g., having the displacement D2 (FIG. 6A)) is in contact with key bearing surface 77. The greater displacement establishes and/or increases the contact pressure between shank surface 94 and key bearing surface 77, relative to the configuration of FIG. 8A and, in some examples, relative to the configuration of FIG. 8B. The increased contact pressure between shank surface 94 and key bearing surface 77 over the orientation depicted at FIG. 8B increases the force such as F1 (FIG. 5) on key bearing surface 77, and may increase one or more forces such as F2, F3, F4, and F5 (FIG. 5) between rotor drive key 74 and wheel 10, and/or forces F6 and F7 (FIG. 5) between fastener 90 and wheel 10. Increasing one or more of forces F1, F2, F3, F4, F5, F6, and/or F7 causes rotor drive key 74 to further engage (e.g., snug against) wheel boss 72 and/or wheel boss 73, and may cause fastener 90 to engage (e.g., snug against) boss aperture 86 of wheel boss 72 and/or boss aperture 87 of wheel boss 73 (FIG. 3).

As depicted in FIGS. 8A-8C, in some examples, the displacement of shank surface 94 from fastener axis B1 may vary in a substantially continuous manner between a minimum displacement (e.g., D1, FIG. 6A) and a maximum displacement (e.g., D2, FIG. 6B), such that the contact pressure between shank surface 94 and key bearing surface 77 varies substantially continuously based on a rotational orientation of fastener 90 relative to wheel 10. Thus, fastener 90 may be placed in a variety of orientations relative to wheel 10, based on a degree of contact pressure desired between shank surface 94 and key bearing surface 77. In other examples, the displacement of shank surface 94 from fastener axis B1 may vary in a step-wise manner rather than in a substantially continuous manner.

Shank medial portion 99 and/or shank surface 94 may be configured such that the magnitude of the displacement D (e.g., a radius) (FIG. 6B)) varies with an angular position $\theta$ around the fastener axis B1, such that rotation of fastener 90 around the fastener axis B1 may increase a contact pressure between shank surface 94 and, for example, key bearing surface 77 (FIG. 3-5). The displacement D may vary with the angular position $\theta$ in a smooth, continuous manner (within manufacturing tolerances) or a discontinuous manner (e.g., to define step changes in the displacement D). The displacement D may have a rate of change with respect to the angular position $\theta$ that is positive (e.g., D increases) over a first interval of the angular position $\theta$ and negative (e.g., D decreases) over a second interval of the angular position $\theta$. Shank medial portion 99 and/or shank surface 94 may be configured to have a first displacement D1 (e.g. A first radius) and a second displacement D2 (e.g., a second radius), with first displacement D1 less than second displacement D2. Shank medial portion 99 may define any suitable cross-section perpendicular to fastener axis B1. In some examples, shank proximal portion defines a substantially circular, oval-shaped, or elliptical cross-section. Shank medial portion 99 is configured to pass at least through boss aperture 86 of wheel boss 72 and support structure slot 75 of rotor drive key 74 (FIGS. 3-5).

Shank proximal portion 93 is configured to extend through boss aperture 86 of wheel boss 72 when shank surface 94 contacts key bearing surface 77 (FIG. 3-5). Shank proximal portion 93 may define any suitable cross-section perpendicular to fastener axis B1. In some examples, shank proximal portion 93 defines a substantially circular, oval-shaped, or elliptical cross-section. In some examples, shank proximal portion 93 defines a surface around fastener axis B1 which substantially conforms to an interior surface of boss aperture 86, in order to enhance support of fastener 90 in the axial A1, radial R1, and tangential T1 direction of wheel 10.

Shank proximal portion 93 may have a displacement D3 (e.g., a radius) that extends from fastener axis B1 to a surface of shank proximal portion 93. Displacement D3 may be greater than, equal to, or less than a particular displacement D of shank medial portion 99 ((e.g., D1, D2, a minimum displacement D, and/or a maximum displacement D). In some examples, displacement D3 is greater than a minimum displacement D of shank medial portion 99 and/or equal (within manufacturing tolerances) to a maximum displacement D of shank medial section 99 to, for example, facilitate passage of shank medial portion 99 through boss aperture 86 when shank proximal portion substantially conforms to boss aperture 86. An area of the cross-section of shank proximal portion 93 may be greater than, equal to, or less than an area of the cross-section of shank medial portion 99. In some examples, the area of the cross-section of shank proximal portion 93 is greater than the area of the cross-section of shank medial portion 99.

Shank distal portion 95 is configured to pass at least through boss aperture 86 of wheel boss 72 and support structure slot 75 of rotor drive key 74, and, in some examples, may be configured to at least extend into boss aperture 87 of wheel boss 73 (FIGS. 3-5). Shank distal portion 95 may define any suitable cross-section perpendicular to fastener axis B1. In some examples, shank distal portion 95 defines a substantially circular, oval-shaped, or elliptical cross-section. In some examples, shank distal portion 95 defines a surface around fastener axis B1 which substantially conforms to an interior surface of boss aperture 87, in order to enhance support of fastener 90 in the axial A1, radial R1, and tangential T1 direction of wheel 10.

Shank distal portion 95 may have a displacement D4 (e.g., a radius) that extends from fastener axis B1 to a surface of shank distal portion 95. Displacement D4 may be greater than, equal to, or less than a particular displacement D of shank medial portion 99 (e.g., D1, D2, a minimum displacement D, and/or a maximum displacement D). In some examples, displacement D4 is less than a maximum displacement D of shank medial portion 99 and/or equal (within manufacturing tolerances) to the minimum displacement D of shank medial section 99 to, for example, facilitate passage of shank distal portion 95 through support structure slot 75 of rotor drive key 74 when fastener 90 extends through boss aperture 86 of wheel boss 72. An area of the cross-section of shank distal portion 95 may be greater than, equal to, or less than an area of the cross-section of shank medial portion 99. In some examples, the area of the cross-section of shank distal portion 95 is less than the area of the cross-section of shank medial portion 99.

Fastener 90 may include one or more pin accesses configured to receive retaining pin 66 (FIGS. 3-5). For example, FIGS. 6A, 6B, 7A, 7B illustrate pin access 68 defined by fastener head 91. Pin access 68 may extend through a thickness of fastener head 91. Pin access 68 may be configured such that retaining pin 66 (FIGS. 3-5) inserts into pin access 68 and extends through fastener head 91. Pin access 68 is configured such that, when retaining pin 66 extends through pin access 68 and inserts into key pin access 65 of rotor drive key 74, retaining pin 66 substantially prevents rotation of fastener 90 around fastener axis B1, relative to rotor drive key 74. Pin access 68 is configured to substantially align with key pin access 65 of rotor drive key 74 when fastener 90 extends through support structure slot 75 of rotor drive key 74, in order to facilitate passage of retaining pin 66 through pin access 68 and at least partially into key pin access 65. Pin access 68 may thus be configured to assist in substantially maintaining fastener 90 in a particular rotational position relative to fastener axis B1, to substantially prevent loosening of fastener 90 during operations of wheel and brake assembly 30 (FIG. 2).

Fastener head 91 may include additional pin accesses, such as pin access 69 (FIGS. 6A, 6B, 7A, 7B). Pin access 69 has a different orientation from pin access 68 relative to fastener axis B1. Additional pin accesses may be present at multiple locations around fastener head 91, in order to provide a plurality of rotational positions for fastener 90 that allow substantial alignment between a pin access and key pin access 65 of rotor drive key 74. Pin access such as pin access 68 and pin accesses 69 may be spaced regularly or irregularly around fastener head 91. In some examples, pin accesses 68, 69, and possibly others are spaced relative to each other based on the displacement D (FIG. 6A, 6B) of shank surface 94, in order to provide a plurality of possible orientations for shank surface 94 relative to wheel 10 when retaining pin 66 is inserted into pin accesses 68, 69, or others and into key pin access 65 (FIGS. 3-5) of rotor drive key 74.

In some examples, pin accesses 68, 69 are arranged on fastener head 91 to provide particular increments of contact pressure (e.g., force) between shank surface 94 and key bearing surface 77 when retaining pin 66 inserts into pin access 68. For example, the configuration of pin access 68, 69 may be based on a magnitude of the displacement D (FIG. 6B) between shank surface 94 and fastener axis B1 as the displacement D varies with an angular position θ around the fastener axis B1. Pin access 68, 69 (and other pin accesses) may be oriented with respect to some portion of shank medial portion 99, in order to, for example, provide a visual reference to an operator rotating fastener 90 when medial portion 99 may not be visible to the operator. Thus, retaining pin accesses 68, 69 (and other pin accesses) may provide a range of contact pressures to increase or decrease the snugness of fit between rotor drive key 74 and wheel 10. Retaining pin accesses 68, 69 (and other pin accesses) may serve as a visual cue to the particular increments of contact pressure available when installing or otherwise adjusting rotor drive key 74 on wheel 10.

Figure 9B:
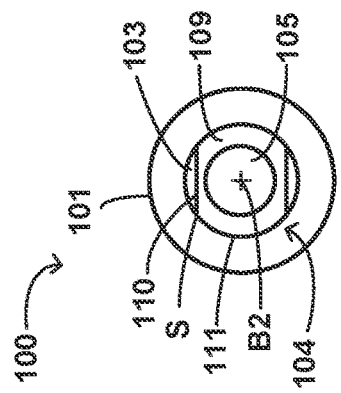
FIG. 9B is a schematic right side view of the example fastener of FIG. 9A.
Figure 9A:
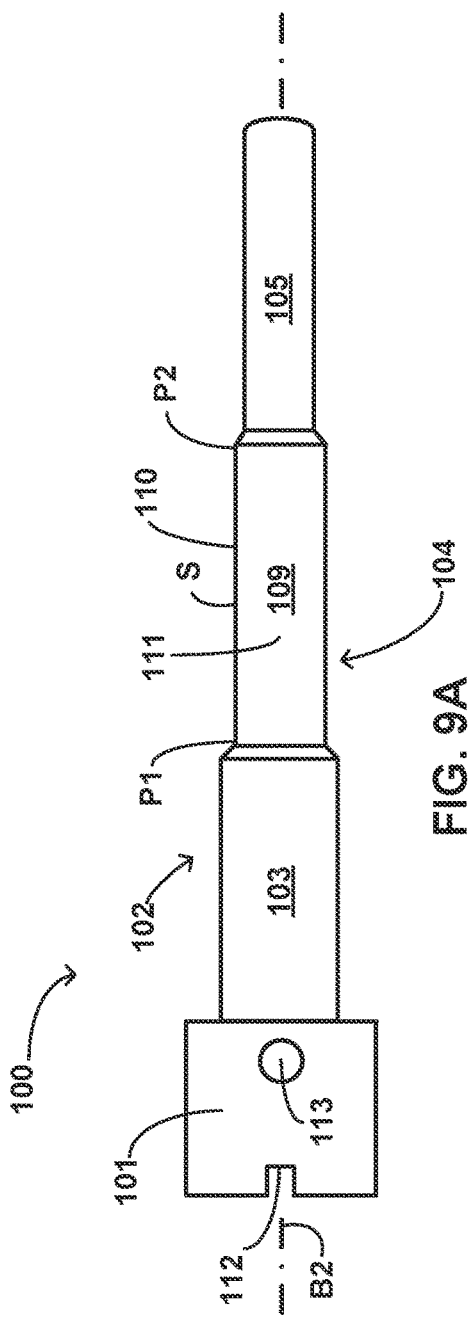
FIG. 9A is a schematic front elevation view of an example fastener including a contact surface.
Figure 10A:
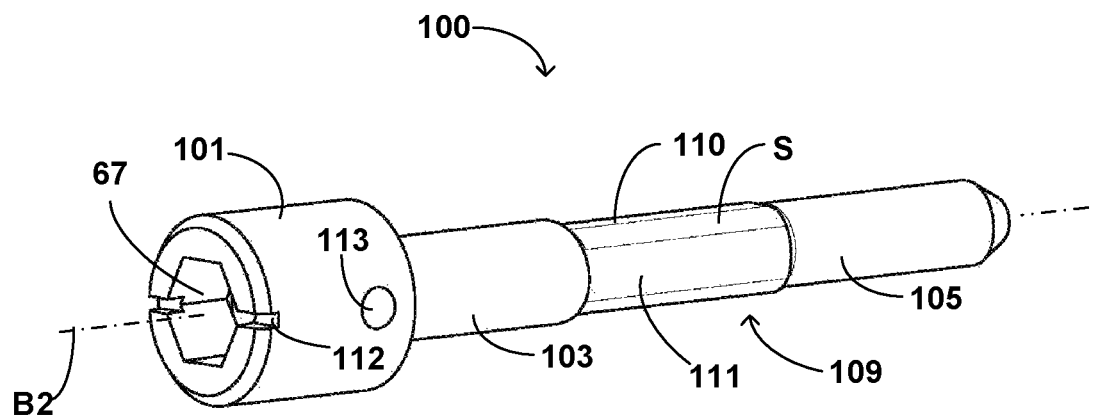
FIG. 10A is a perspective view of the example fastener of FIG. 9A and FIG. 9B.
Figure 10B:
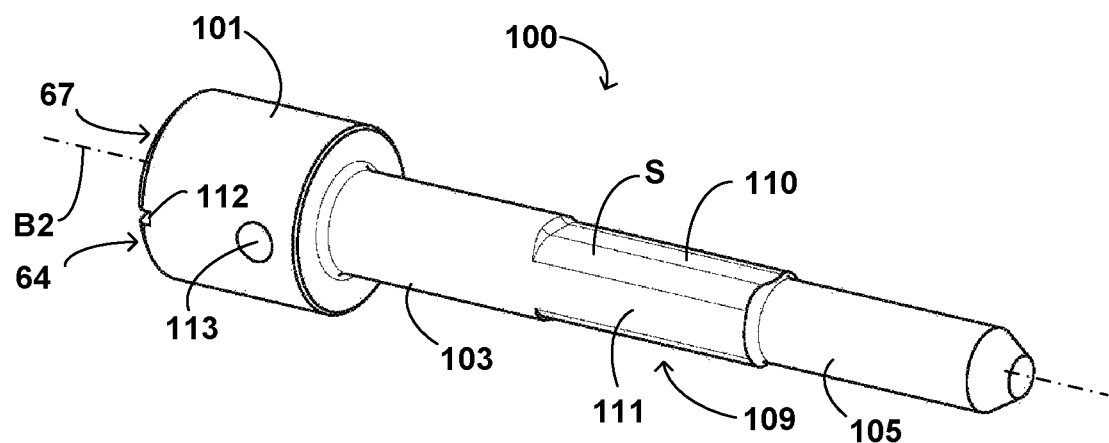
FIG. 10B is another perspective view of the example fastener of FIG. 10A.
Figure 11:
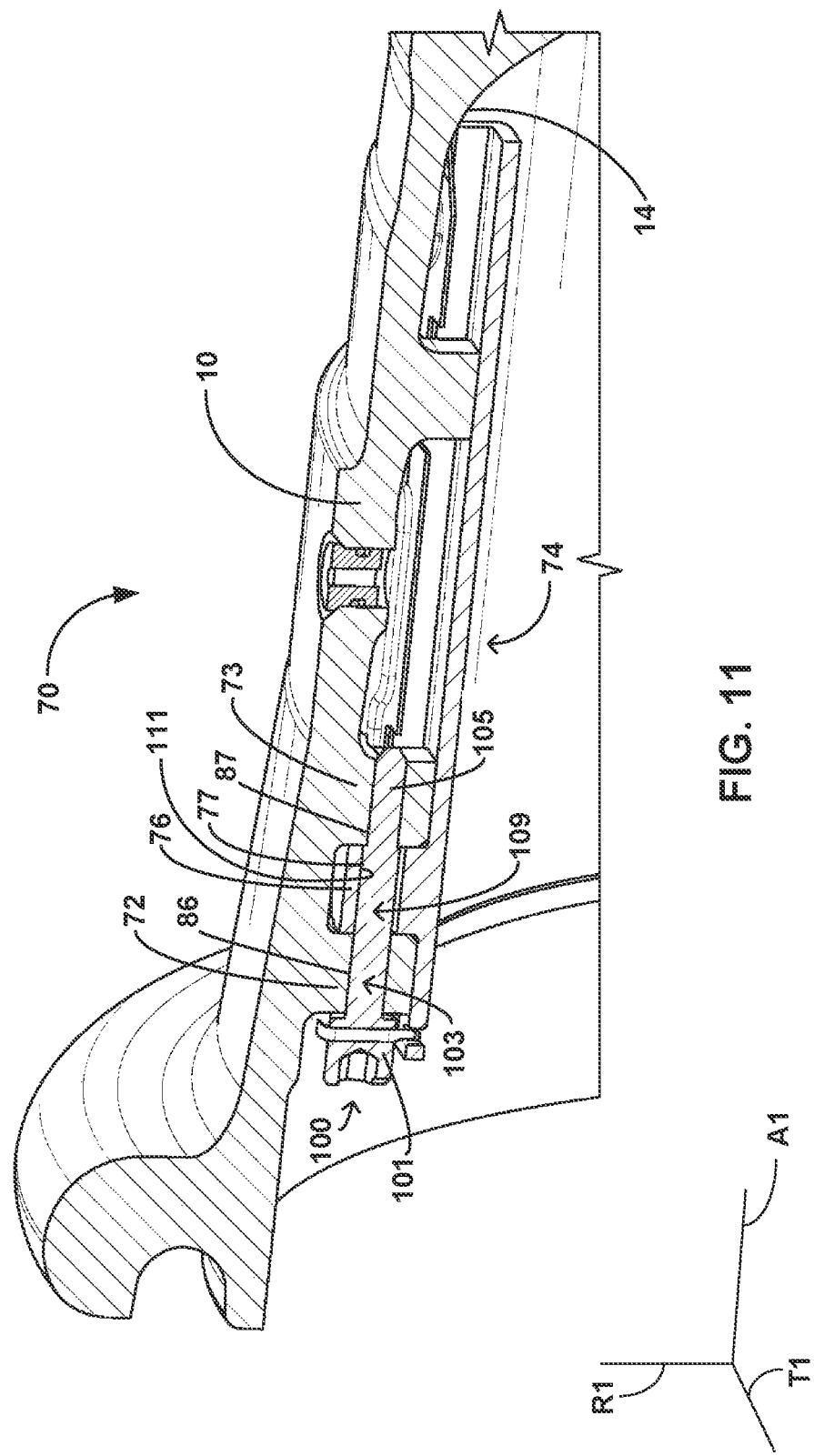
FIG. 11 is a perspective view of an example rotor drive key and an example fastener on an interior surface of an example wheel.

Returning to FIGS. 3-5, in some examples shank surface 84 may be configured to enable medial portion 89 of fastener 80 to insert into rotor drive key 74 (e.g., into support structure slot 75) with little (or no) contact between shank surface 84 and key bearing surface 77, and be configured to provide a substantially uniform contact pressure between shank surface 84 and key bearing surface 77 as fastener 80 is rotated about the respective fastener axis. As an example, FIG. 9A and FIG. 9B illustrate schematic plan views of an example fastener 100, with FIGS. 10A and 10B illustrating perspective views of fastener 100. FIG. 11 illustrates a perspective view of an example assembly 70 including wheel 10, fastener 100, and rotor drive key 74, with fastener 100 extending through boss aperture 86 of wheel boss 72, through support structure slot 75, and through boss aperture 87 of wheel boss 73. Fastener 100 may be an example of fastener 80 (FIG. 3-5). Shank surface 104 of fastener 100 is configured to generate a contact pressure with key bearing surface 77 as fastener 100 is rotated about fastener axis B2 defined by fastener 100.

Fastener 100 includes fastener shank 102, shank surface 104, and fastener head 101. Fastener axis B2 extends through fastener head 101 and fastener shank 102, e.g., through a center of fastener head 101. A proximal portion 103 of shank 102 ("shank proximal portion 103") is between a medial portion 109 of fastener shank 102 ("shank medial portion 109") and fastener head 101. Shank medial portion 109 is between a distal portion 105 of shank 102 ("shank distal portion 102") and shank proximal portion 103. Fastener head 101 may be an example of fastener head 81 (FIGS. 3-5), fastener shank 102 may be an example of fastener shank 82 (FIGS. 3-5), shank proximal portion 103 may be an example of shank proximal portion 83 (FIGS. 3-5), shank medial portion 109 may be an example of shank medial portion 89 (FIGS. 3-5), shank distal portion 105 may be an example of shank distal portion 85 (FIGS. 3-5), and shank surface 104 may be an example of shank surface 84 (FIGS. 3-5).

Shank surface 104 defines a non-circular cross-section perpendicular to fastener axis B2 configured to increase a contact pressure between shank surface 104 and key bearing surface 77 when fastener 100 rotates around fastener axis B2. For example, in the example shown in FIGS. 9A-11, shank surface 104 defines a first section 110 and a second section 111. First section 110 may be substantially flatter and have a lower curvature than second section 111. A contact surface S joins first section 110 and second section 111. Contact surface S may be, for example, a substantially rounded or sharp corner. Contact surface S transitions shank surface 104 from second section 111 to first section 110 and vice-versa.

First section 110 may extend over some distance of shank surface 104 in a direction substantially parallel to fastener axis B2. Second section 111 may extend over a distance of shank surface 104 in a direction substantially parallel to fastener axis B2. For example, first section 110 and/or second section 111 may extend over shank surface 104 from the point P1 to the point P2 (FIG. 9A, 9B), or extend over some portion of shank surface 104 between P1 and P2. Point P1 may be substantially located at a transition between shank proximal portion 103 and shank surface 104, or may be at some other point on shank surface 104. Point P2 may be substantially located at a transition between shank surface 104 and shank distal portion 105, or may be at some other point on shank surface 104.

Shank surface 104 may be configured such that when fastener 100 extends axially through wheel boss 72 and rotor drive key 74 (e.g., through support structure slot 75 (FIGS. 3-5)) and first section 110 faces key bearing surface 77, first section 110 establishes little (or no) contact and/or contact pressure with key bearing surface 77. Shank surface 100 may be configured to increase the contact pressure as fastener 100 rotates around fastener axis B2 and contact surface S bears on some portion of key bearing surface. Shank surface 100 may be configured such that contact surface S substantially rotates past key bearing surface 77 such that second section 111 is in contact with key bearing surface 77, and second section 111 exerts a contact pressure on key bearing surface 77.

Figure 12C:
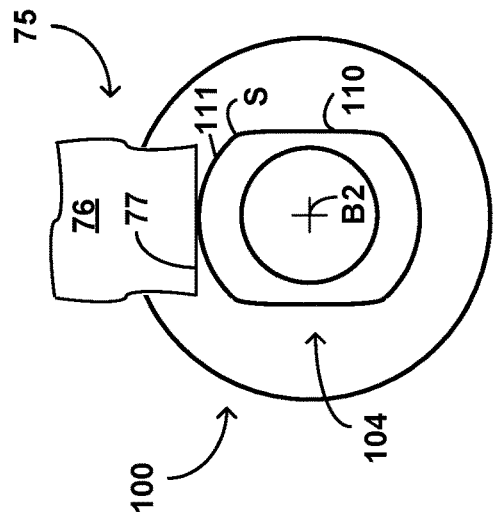
FIG. 12C is schematic illustration of the example fastener and contact surface of FIGS. 12A and 12B in a third rotational orientation.
Figure 12B:
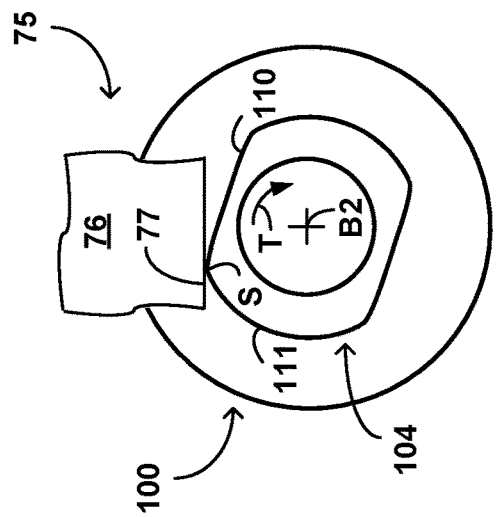
FIG. 12B is schematic illustration of the example fastener and contact surface of FIG. 12A in a second rotational orientation.
Figure 12A:
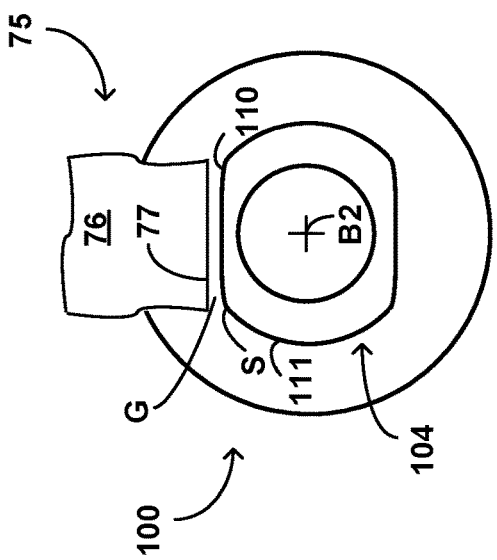
FIG. 12A is schematic illustration of an example fastener and contact surface in a first rotational orientation.

For example, FIGS. 12A-12C illustrate conceptual end elevations of fastener 100 extending into support structure slot 75 defined by a section of support structure 76 of rotor drive key 74. FIGS. 12A-12C illustrates different rotational orientations of fastener 100 around fastener axis B2 and relative to key bearing surface 77. Contact surface S transitions shank surface 104 from second section 111 to first section 110 and vice-versa.

In FIG. 12A, fastener 100 inserted within support structure slot 75 such that first section 110 faces key bearing surface 77. First section 110 is displaced from key bearing surface 77 by gap G, such that there is no contact pressure between shank surface 104 and key bearing surface 77. The availability of this orientation of fastener 100 relative to key bearing surface 97 may aid the insertion of fastener 100 into support structure slot 75 during assembly, or aid the withdrawal of fastener 100 from support structure 75 during disassembly. In some examples, fastener 100 may include a visual indicator 112 (FIG. 9A, 10A, 10B)) on fastener head 101 to serve as an indicator of the orientation of first section 110. For example, first section 110 may not be visible to an operator during an installation or removal of fastener 100.

In some examples, when first section 110 substantially faces key bearing surface 77, a vector originates from first section 110 and intersects key bearing surface 77 without passing through first section 110, and a negative of the vector originates from key bearing surface 77 and intersects first section 110 without passing through key bearing surface 77. First section 110 may be configured to face key bearing surface 77 such that gap G is present (FIG. 12A), or, in some examples, first section 110 may be configured to contact key bearing surface 77 when facing key bearing surface 77. For example, first section 110 may be substantially flush with key bearing surface 77 when facing key bearing surface 77.

FIG. 12B illustrates fastener 100 having rotated, from the rotational orientation shown in FIG. 12A, in the direction of torque T relative to the section of support structure 76 and about axis B2. The torque T may be applied via fastener head 101 (FIG. 9A, 9B, 10A, 10B). As depicted in FIG. 12B, fastener 100 has rotated such that contact surface S is in contact with key bearing surface 77, generating a contact pressure between contact surface S and key bearing surface 77. The contact pressure acts to generate the force F1 (FIG. 5) imparted by shank surface 104 onto key bearing surface 77. As rotation of fastener 100 continues, the substantially point contact between contact surface S and key bearing surface 77 may cause the torque T required for fastener 100 rotation to initially increase, then remain at a substantially uniform value as contact surface S moves across key bearing surface 77. Fastener 100 may continue to rotate (e.g., due to torque T) until contact surface S moves across and past key bearing surface 77.

FIG. 12C illustrates fastener 100 having rotated, from the rotational orientation shown in FIG. 12B, relative to the section of support structure 76 and about axis B2 such that contact surface S has moved past key bearing surface 77, and second section 111 is in contact with key bearing surface 77. Second section 111 maintains a contact pressure on key bearing surface 77, such that shank surface 104 continues to impart the force F1 (FIG. 5) onto key bearing surface 77. In examples, the increased curvature of second section 111 relative to first section 110 assists in maintaining the contact pressure once contact surface S has rotated past key bearing surface 77. The contact pressure between shank surface 104 and key bearing surface 77 when second section 111 is in contact with key bearing surface 77 generates a force such as F1 (FIG. 5) on key bearing surface 77, and may generate one or more forces such as F2, F3, F4, and F5 (FIG. 5) between rotor drive key 74 and wheel 10, and/or forces F6 and F7 (FIG. 5) between fastener 100 and wheel 10.

First section 110 and second section 111 may be configured such that rotation of contact surface S past key bearing surface 77 may be sensed by an operator applying torque to fastener head 101. That is, when contact surface S rotates past tab bearing surface 77, there may be some haptic feedback to the operator that contact surface S has rotated past key bearing surface 77 and second section 111 is in contact with tab bearing surface 77. First section 110 and second section 111 may be configured such that a slight decrease in torque is required when second section 111 is in contact with key bearing surface 77, as compared to the torque required when contact point C1 is in contact with key bearing surface 77. The haptic feedback may assist an operator in positioning fastener 100 during installation of rotor drive key 74 on wheel 10.

In some examples, retaining pin 66 may be positioned to extend through some portion of fastener 100 (such as access 113 of fastener head 101) in order to substantially secure fastener 100 relative to rotor drive key 74. Pin access 113 may be configured with respect to fastener head 101 and rotor drive key 74 in the same manner that pin access 68, 69 (and other pin accesses) are configured with respect to fastener head 91 and rotor drive key 74. In some examples, pin access 113 is oriented with respect to some portion of medial portion 109, in order to, for example, provide a visual reference to an operator rotating fastener 100 when medial portion 109 may not be visible. For example, on fastener 109 (FIGS. 9A, 9B, 10A, 10B), pin access 113 has a fixed orientation with respect to first section 110 and second section 111. The fixed orientation may provide a visual marker to an operator indicating a desired rotational position of fastener 100 relative to key bearing surface 77 when, for example, medial portion 109 may not be visible.

Returning to FIG. 3, and as discussed, fastener 80 is configured to extend through at least boss aperture 86 of wheel boss 72 to substantially secure rotor drive key 74 against movement in at least the radial direction R1 of wheel 10. With fastener 80 extending through wheel boss 72, fastener 80 may establish a contact pressure with rotor drive key 74 that maintains retention of rotor drive key 74 against wheel 10 without the use of radially extending bolts. The contact pressure established by fastener 80 against key bearing surface 77 anchors rotor drive key 74 and allows rotor drive key 74 to substantially cantilever in an axial direction A1 of wheel 10. The cantilever support provided by fastener 80 when extended axially through wheel boss 72 may allow elimination of attachment mechanisms (e.g., bolts) which extend substantially in the radial direction R1 of wheel 10. The contact pressure provided by fastener 80 may cause rotor drive key 74 to more closely snug against, for example, wheel boss 72, enhancing the support provided by wheel boss 72 to substantially prevent movement of rotor drive key in the axial A1 and tangential T1 directions of wheel 10.

In some examples, rotor drive key 74 may also be configured to engage at least wheel boss 72 such that wheel boss 72 substantially secures rotor drive key 74 against movement in the axial direction A1 and tangential direction T1 of wheel 10. Thus, rotor drive key 74 may be configured to secure against wheel 10 in a manner substantially preventing movement of rotor drive key 74 in the radial R1, axial A1, and tangential T1 directions, when fastener 80 extends through wheel boss 72 and establishes a contact pressure against key bearing surface 77. Rotor drive key 74 may be configured to secure against wheel 10 in this manner without the use of additional attachment mechanisms (e.g., screws and/or bolts) extending through rotor drive key 74 in a radial direction R1 of wheel 10.

For example, rotor drive key 74 may include support structure 76 configured to engage with wheel boss 72 and configured to engage with fastener 80. Support structure 76 can provide a surface upon which fastener 80 may exert a contact pressure (e.g., via shank surface 84). Support structure 76 is configured to receive some portion of fastener 80 when fastener 80 extends through at least wheel boss 72 in the axial direction A1 of wheel 10. Support structure 76 may include a support structure slot 75 configured to receive the portion of fastener 80 and provide key bearing surface 77 to receive the contact pressure exerted by fastener 80. When fastener 80 extends through support structure slot 75, support structure slot 75 may completely surround fastener 80 (e.g., some portion of support structure slot 75 may be a circular or non-circular hole through support structure 76) and/or may partially surround fastener 80 (e.g., some portion of support structure slot 75 may substantially overhang some portion of fastener 80 without completely surrounding fastener 80).

Figure 13:
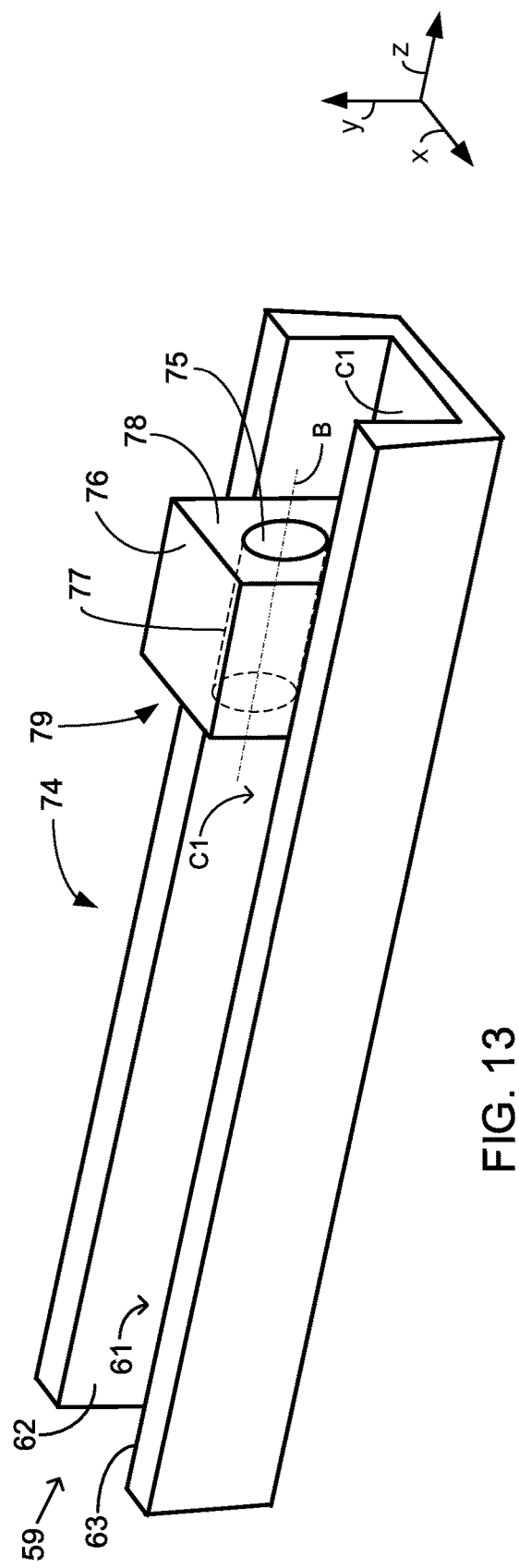
FIG. 13 is a perspective view of an example rotor drive key.
Figure 15C:
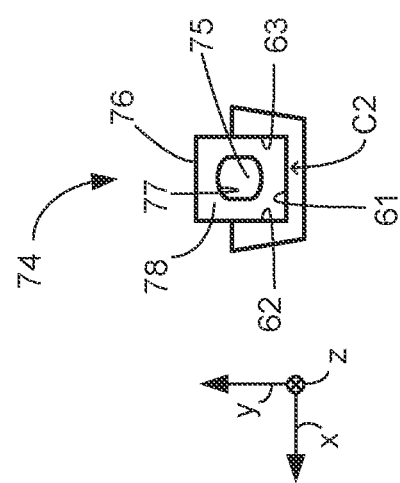
FIG. 15C is a schematic side view of the rotor drive key of FIG. 15A and FIG. 15B.
Figure 15B:
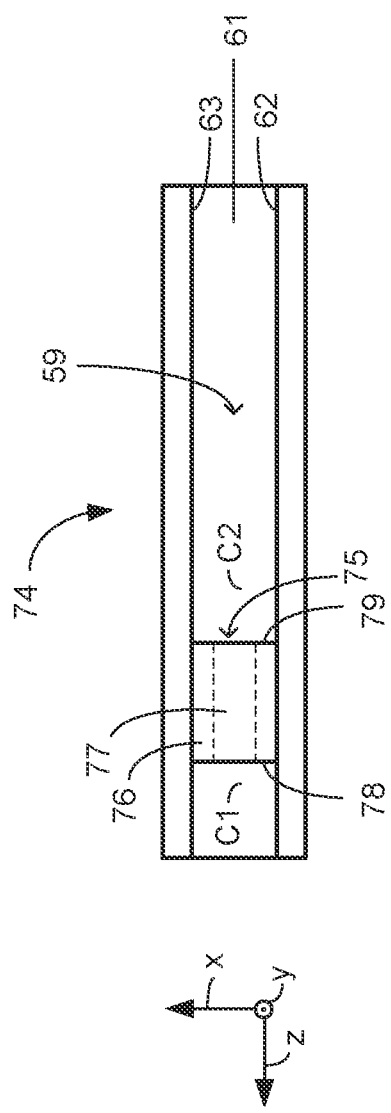
FIG. 15B is a schematic top view of the rotor drive key of FIG. 15A.
Figure 15A:
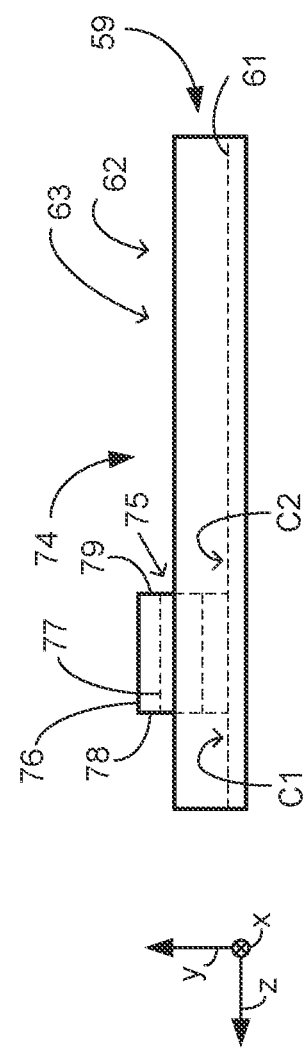
FIG. 15A is a schematic front elevation view of an example rotor drive key.

As an example, FIG. 13 illustrates an isometric view of an example rotor drive key 74 including support structure 76. Support structure 76 defines support structure slot 75 defining key bearing surface 77 (shown as a hidden surface in FIG. 13). FIGS. 15A-15C provide elevation views of rotor drive key 74, with FIG. 15A providing a front elevation view, FIG. 15B providing a top elevation view, and FIG. 15C providing a side elevation view. FIG. 13 and FIGS. 15A-15C are oriented with respect to the x-y-z axes shown in each figure. At FIGS. 15A-15C, a circled x indicates an axis proceeding into the page. Rotor drive key 74 of FIG. 13 and FIGS. 15A-15C includes contact area C1, contact area C2, support structure 76, support structure slot 75, key bearing surface 77, and trough 59 including trough base 61, trough first side 62, and trough second side 63.

Support structure slot 75 and fastener 80, 90, 100 may be configured such that when fastener 80, 90, 100 inserts into support structure slot 75, key bearing surface 77 substantially faces the respective fastener medial portion 89, 99, 109. Support structure slot 75 is configured such that when fastener 80, 90, 100 inserts into support structure slot 75, contact between key bearing surface 77 and fastener 80, 90, 100 (e.g., by shank surface 84, 94, 104) may be established or maintained when fastener 80, 90, 100 is rotated around fastener axis B. Key bearing surface 77 may face shank surface 84, 94, 104 such that a vector may originate from key bearing surface 77 and intersect shank surface 84, 94, 104 without passing through key bearing surface 77, and a negative of the vector may originate from shank surface 84, 94, 104 and intersect key bearing surface 77 without passing through shank surface 84, 94, 104. Support structure slot 75 is configured to substantially align with at least boss aperture 86 of wheel boss 72 when rotor drive key 74 is positioned over wheel boss 72, so that fastener 80, 90, 100 may extend through boss aperture 86 and establish contact with key bearing surface 77.

Support structure slot 75 is configured to substantially align with boss aperture 86 of wheel boss 72 and, in some examples, substantially align with boss aperture 87 of wheel boss 73, when rotor drive key 74 is positioned over wheel boss 72 and wheel boss 73, so that fastener 80, 90, 100 may establish contact with key bearing surface 77 while extending through boss aperture 86 and at least partially into boss aperture 87.

Rotor drive key 74 may be configured to transmit forces acting on key bearing surface 77 (e.g., forces from fastener 90, 90, 100) to other portions of rotor drive key 74 configured to contact wheel 10, in order to cause rotor drive key 74 to fit more snugly against wheel 10. For example, rotor drive key 74 may be configured to contact at least one surface of wheel boss 72 at contact area C1 (FIG. 3, 5), and be configured such that, when fastener 80, 90, 100 exerts a contact pressure on key bearing surface 77 (generating, e.g., force F1 (FIG. 5)), rotor drive key 74 exerts a force (e.g., F2 (FIG. 5)) on wheel boss 72. Rotor drive key may be configured to such that the contact pressure on key bearing surface 77 generates additional forces on other wheel bosses (e.g., F4 on wheel boss 73 (FIG. 5)). The forces F2 and/or F4 generated by contact pressure from fastener 80, 90, 100 and the configuration of rotor drive key 74 may cause rotor drive key 74 to more firmly snug against wheel boss 72 and/or wheel boss 73. Rotor drive key 74 may be configured such that resulting reaction forces from wheel boss 72 (e.g., F3 (FIG. 5)) and/or wheel boss 73 (e.g., F5 (FIG. 5)) effectively trap rotor drive key 74 against wheel boss 72 and/or wheel boss 73, such that rotor drive key 74 is effectively secured to wheel 10 without the use of bolts and/or attachment mechanisms extending substantially in the axial direction A1 of wheel 10.

In an example, rotor drive key 74 is configured such that, when rotor drive key 74 contacts wheel boss 72 and fastener 80 extends through wheel boss 72 and exerts a first force (e.g., F1) on key bearing surface 77, rotor drive key 74 exerts a second force (e.g., F2) on wheel boss 72, where the second force acts at least partially in a direction parallel to the first force. Support structure 76 may be configured to receive the contact pressure exerted by fastener 80, 90, 100 and transmit forces generated by the contact pressure to locations on rotor drive key 74 (e.g., contact area C1 and/or contact area C2) to snug rotor drive key 74 against wheel boss 72 and/or wheel boss 73 (FIG. 3, 4).

Support structure 76 of rotor drive key 74 may receive the contact pressure exerted by fastener 80, 90, 100 via key bearing surface 77. Key bearing surface 77 is an interior surface of support structure 76 defining support structure slot 75 configured such that, when fastener 80, 90, 100 extends through support structure slot 75 in a direction parallel to the z axis and exerts a contact pressure on key bearing surface 77, the contact pressure generates a force on key bearing surface 77 acting at least partially in the positive direction of the y-axis. Rotor drive key 74 is configured such that the force on key bearing surface 77 generates a force acting at least partially in the positive direction of the y-axis at contact area C1 and a force acting at least partially in the positive direction of the y-axis at contact area C2. Rotor drive key 74 may thus be configured to behave as a rigid body, at least with respect to key bearing surface 77, contact area C1, and/or contact area C2. Rotor drive key 74 is configured to contact wheel boss 72 (FIGS. 3-5) at contact area C1 and/or wheel boss 73 (FIGS. 3-5) at contact area C2, so the contact pressure exerted by fastener 80, 90, 100 on key bearing surface 77 traps rotor drive key 74 to substantially prevent movement in a direction parallel to the y-axis. Trough base 61 (FIGS. 15A-15C) may include contact area C1 and/or contact area C2.

Rotor drive key 74 may be configured to engage some portion of wheel boss 72 and/or wheel boss 73 such that wheel boss 72 and/or wheel boss 73 substantially secure rotor drive key 74 against movement in the axial direction A1 of wheel 10. In some examples, rotor drive key 74 is configured such that wheel boss 72 substantially secures rotor drive key 74 against movement in the axial direction A1 toward wheel boss 72 and/or 73. In some examples, rotor drive key 74 is configured such that wheel boss 73 substantially secures rotor drive key 74 against movement in the axial direction A1 toward wheel boss 72 and/or 73.

Figure 14:
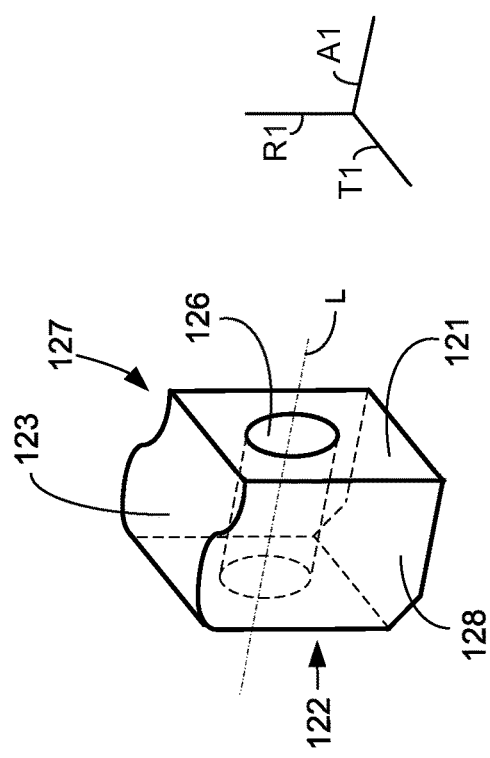
FIG. 14 is a perspective view of a section of an example wheel boss.

As an example, FIG. 14 provides an isometric illustration of a section of an example wheel boss 123. Wheel boss 123 may be an example of wheel boss 72 or wheel boss 73. Wheel boss 123 is shown oriented according to the axial direction A1, radial direction R1, and tangential direction T1 of wheel 10 (FIGS. 3-5). The axial direction A1, radial direction R1, and tangential direction T1 of wheel 10 may be substantially parallel to the z axis, y axis, and x axis respectively of FIG. 13 and FIGS. 15A-15C. Wheel boss 123 defines boss aperture 126, boss front surface 121, boss back surface 122, boss first side 127, and boss second side 128. Boss back surface 122 and boss first side 127 are shown as hidden surfaces in the view shown in FIG. 13. Boss aperture 126 is illustrated as extending fully from boss front surface 121 to boss back surface 122, however this is not required. In some examples, boss aperture 126 may extend from boss front surface 121 and into wheel boss 123 generally along axis L without fully extending to boss back surface 122. Thus, boss aperture 126 may be an example of boss aperture 86 of wheel boss 72 and boss aperture 87 or wheel boss 73.

Returning to FIG. 13 and FIGS. 15A-15C, rotor drive key 74 may include a front face 78 configured to engage wheel boss 72 and oppose movement toward wheel boss 72 and in the axial direction A1 of wheel 10. In an example, when rotor drive key 74 is positioned such that boss aperture 126 of wheel boss 123 (FIG. 14) substantially aligns with support structure slot 75, front face 78 is configured to engage (contact and/or frictionally engage) wheel boss 123 to substantially prevent movement in the axial direction A1 of wheel 10. For example, front face 78 may engage boss back surface 122 of wheel boss 123. Front face 78 may include substantially planar and/or curvilinear surfaces Front face 78 may be configured to substantially conform to boss back surface 122. When fastener 80, 90, 100 extends through wheel boss 123 and support structure 76, front face 78 may substantially face boss back surface 122 such that a vector may originate from front face 78 and intersect back surface 122 without passing through front face 78, and a negative of the vector may originate from boss back surface 122 and intersect front face 78 without passing through boss back surface 122. Front face 78 may intersect a portion of trough base 61 and meet trough base 61 at a corner (e.g., a sharp or rounded corner) in order to substantially prevent movement in the axial direction A1 when trough base 61 contacts wheel boss 123. In an example, a first vector in the y-z plane (FIG. 13, 15A-15C) is parallel to a surface of trough base 61 and a second vector in the y-z plane is parallel to a portion of front face 78, and a minimum angle between the two vectors in greater than 30 degrees. In some examples, the minimum angle is greater than 45 degrees.

Rotor drive key 74 may include a back face 79 configured to engage wheel boss 73 and oppose movement toward wheel boss 73 and in the axial direction A1 of wheel 10. Back face 79 may be on a side of support structure 76 substantially opposite front face 78. In an example, when wheel boss 123 is an example of wheel boss 73 (FIG. 3-5), when rotor drive key 74 is positioned such that boss aperture 126 of wheel boss 123 (FIG. 14) substantially aligns with support structure slot 75, back face 79 is configured to engage (contact and/or frictionally engage) wheel boss 123 to substantially prevent movement in the axial direction A1 of wheel 10. For example, back face 79 may engage boss front surface 121 of wheel boss 123. Back face 79 may include substantially planar and/or curvilinear surfaces Back face 79 may be configured to substantially conform to boss front surface 121. When fastener 80, 90, 100 extends through support structure 76 and at least partially into wheel boss 123, back face 79 may substantially face boss front surface 121 such that a vector may originate from back face 79 and intersect boss front surface 121 without passing through back face 79, and a negative of the vector may originate from boss front surface 121 and intersect back face 79 without passing through boss front surface 121. Back face 79 may intersect a portion of trough base 61 and meet trough base 61 at a corner (e.g., a sharp or rounded corner) in order to substantially prevent movement in the axial direction A1 when trough base 61 contacts wheel boss 123. In an example, a first vector in the y-z plane (FIG. 13, 15A-15C) is parallel to a surface of trough base 61 and a second vector in the y-z plane is parallel to a portion of back face 79, and a minimum angle between the two vectors is greater than 30 degrees. In some examples, the minimum angle is greater than 45 degrees.

In some examples, front face 78 comprises a first planar surface and boss back surface 122 comprises a second planar surface, and when fastener 80, 90, 100 extends at least through wheel boss 123 and support structure 76, the first planar surface is in contact with and substantially parallel to the second planar surface. In other examples, front face 78 and boss back surface 122 may define complementary surfaces other than planar surfaces, such as complementary curvilinear surfaces. In some examples, back face 79 comprises a third planar surface and boss front surface 121 comprises a fourth planar surface, and when fastener 80, 90, 100 extends through support structure 76 and at least partially into wheel boss 123, the third planar surface is in contact with and substantially parallel to the fourth planar surface. In other examples, back face 79 and boss front surface 121 may define complementary surfaces other than planar surfaces, such as complementary curvilinear surfaces.

In some examples, rotor drive key 74 is configured to surround at least part of wheel boss 72 to help further prevent movement of rotor drive key 74 relative to wheel boss 72 in at least the tangential direction T1 of wheel 10. For example, as shown in FIG. 12, rotor drive key 74 may define a trough 59 forming an open, channel-like passage. Trough 59 may be configured to receive wheel boss 123 (e.g., wheel boss 72 and/or wheel boss 73) when fastener 80, 90, 100 extends into wheel boss 123 and support structure 76, such that trough 59 substantially opposes movement of rotor drive key 74 in at least the tangential direction T1 of wheel 10. For example, FIG. 13 and FIGS. 15A-15C illustrate trough 59 including trough base 61, trough first side 62, and trough second side 63. Trough first side 62 and trough second side 63 are attached to trough base 61, with trough second side 63 substantially opposite trough first side 62. Trough first side 62 and trough second side 63 may be physically separate from trough base 61 and mechanically attached to trough base 61, or may be integrally formed with trough base 61.

Trough first side 62, trough second side 63, and trough base 61 extend at least part of the length of rotor drive key 74 and bound trough 59. In some examples, such as depicted at FIG. 13 and FIGS. 15A-15C, support structure 76 is positioned within trough 59. Trough 59 is configured to surround some part wheel boss 123 (FIG. 14) when rotor drive key 74 is installed over wheel boss 123. In some examples, trough 59 may surround at least some part of boss first side 127 and some part of boss second side 128 when rotor drive key 74 is positioned over wheel boss 123, such that trough 59 substantially prevents movement of rotor drive key 74 the tangential direction T1 of wheel 10. In some examples, when rotor drive key 74 is positioned over wheel boss 123, trough first side 62 of trough 59 contacts boss first side 127 of wheel boss 123 and/or trough second side 63 of trough 59 contacts boss second side 128 of wheel boss 123. In some examples, trough 59 and/or wheel boss 123 is configured to provide an engineering fit between trough 59 and wheel boss 123. The engineering fit may be a fit such as a sliding fit, a locational fit, a transitional fit, or an interference fit. Such a fit may provide increased tangential and radial stability of rotor drive key 74 during rotation and braking of wheel 10, among other advantages.

In some examples, trough base 61 of trough 59 extends in a direction parallel to the x axis and in a direction parallel to the z axis, and support structure 76 extends away from trough base 61 in a direction parallel to the y-axis. In an example, support structure 76 and trough base 61 behave as a rigid body, such that forces exerted on support structure 76 (such as a contact pressure on key bearing surface 77) transmit to one or more portions of trough base 61 (such as contact area C1 and/or contact area C2).

In some examples, in order to assist in maintaining the radial, axial, and tangential positions of rotor drive key 74 on wheel 10, a first surface within assembly 70 (FIGS. 3 and 4) and a second surface within assembly 70 are complementary surfaces. For example, one of the first surface and the second surface might be a convex surface, with the other being a concave surface configured to receive and at least partially mate with the convex surface. In some examples, one of the first surface or the second surface defines a protrusion, and the other of the first surface or the second surface defines a recess configured to receive and at least partially mate with the protrusion. In some examples, the protrusion is a convex surface and the recess is a convex surface. In some examples, the first surface is configured to form a mating connection with the second surface.

In some examples, the first surface and the second surface are frictionally engaged. In some examples, front face 78 (FIGS. 13 and 15A-15C) is the first surface and boss back surface 122 (FIG. 13) is the second surface. In some examples, back face 79 (FIGS. 13 and 15A-15C) is the first surface and boss front surface 121 (FIG. 14) is the second surface. In some examples, trough first side 62 (FIGS. 13 and 15A-15C) is the first surface and boss first side 127 (FIG. 14) is the second surface. In some examples, trough second side 63 (FIGS. 13 and 15A-15C) is the first surface and boss second side 128 (FIG. 14) is the second surface.

Rotor drive key 74 and fastener 80, 90, 100, as well as other components described herein, may be made from any suitable material. For example, the material may be any material of suitable strength for the intended use of rotor drive key 74 or fastener 80, 90, 100. In some examples, the material includes a metal or a metal alloy. For example, the material may include a nickel alloy or steel alloy. As one example, the material may include stainless steel.

In some examples, rotor drive key 74 may be forged, casted, made from bar stock, additive manufactured (e.g., three-dimensionally (3D) printed), or be produced using other suitable methods. In some examples rotor drive key 74 may be machined, and in some examples rotor drive key 74 may be forged, cast, or otherwise formed (e.g., without having to be substantially machined) and/or additive manufactured, to obtain a rotor drive key 74 defining one or more of support structure 76, support structure slot 75, key bearing surface 77, trough 59, trough base 61, trough first side 62, trough second side 63, and key pin access 65.

In some examples, fastener 80, 90, 100 may be forged, casted, made from bar stock, additive manufactured (e.g., three-dimensionally (3D) printed), or be produced using other suitable methods. In some examples, fastener 80, 90, 100 may be machined, and in some cases fastener 80, 90, 100 may be forged, cast, or otherwise formed (e.g., without having to be substantially machined) and/or additive manufactured, to obtain a fastener 80, 90, 100 defining one or more of fastener head 81, 91, 101, fastener shank 82, 92, 102, shank proximal portion 83, 93, 103, shank medial portion 89, 99, 109, shank surface 84, 94, 104, recess 110, shank distal portion 85, 95, 105, socket drive 67, pin access 68, and pin access 69.

In some examples, wheel 10 may be finish machined from a near-net-shaped aluminum forging and contain wheel bosses for assembly of rotor drive key 74 onto wheel 10 using fastener 80, 90, 100 extending through for example wheel boss 72 and support structure 76. In other examples, wheel 10 may be manufactured in a different manner. In yet other examples, wheel 10 may be obtained rather than manufactured. In some examples, wheel 10 may be obtained and machined to form interior surface 14 including a plurality of wheel bosses. Wheel 10 may be made of any suitable material. In some examples, wheel 10 includes a metal or a metal alloy. For example, wheel 10 may include aluminum, a nickel alloy, a steel alloy (e.g., stainless steel), titanium, a carbon-composite material, or magnesium.

Wheel 10 may comprise any number of wheel bosses and any number of assemblies 70 (FIG. 3). Wheel bosses (including wheel boss 72 and/or wheel boss 73) protruding from interior surface 14 may extend in a substantially radial direction from adjacent portions of interior surface 14. A wheel boss may extend more radially inward than respective portions of interior surface 14 adjacent to the wheel boss. In some examples, wheel bosses may have any suitable height in the substantially radial direction. Moreover, a plurality of wheel bosses may comprise wheel bosses having the same height or substantially the same height, or comprise wheel bosses having different heights. Similarly, a plurality of wheel bosses may comprise wheel bosses having the same width or substantially the same width, or comprise wheel bosses having different widths. In some examples, wheel bosses may be present at substantially equal circumferential distances around interior surface 14 of wheel 10. In other examples, one or more of a plurality of wheel bosses may be present at different circumferential distances from an adjacent wheel boss. Additionally, wheel bosses may be any suitable distance from each other in the axial direction of wheel 10.

Figure 16:
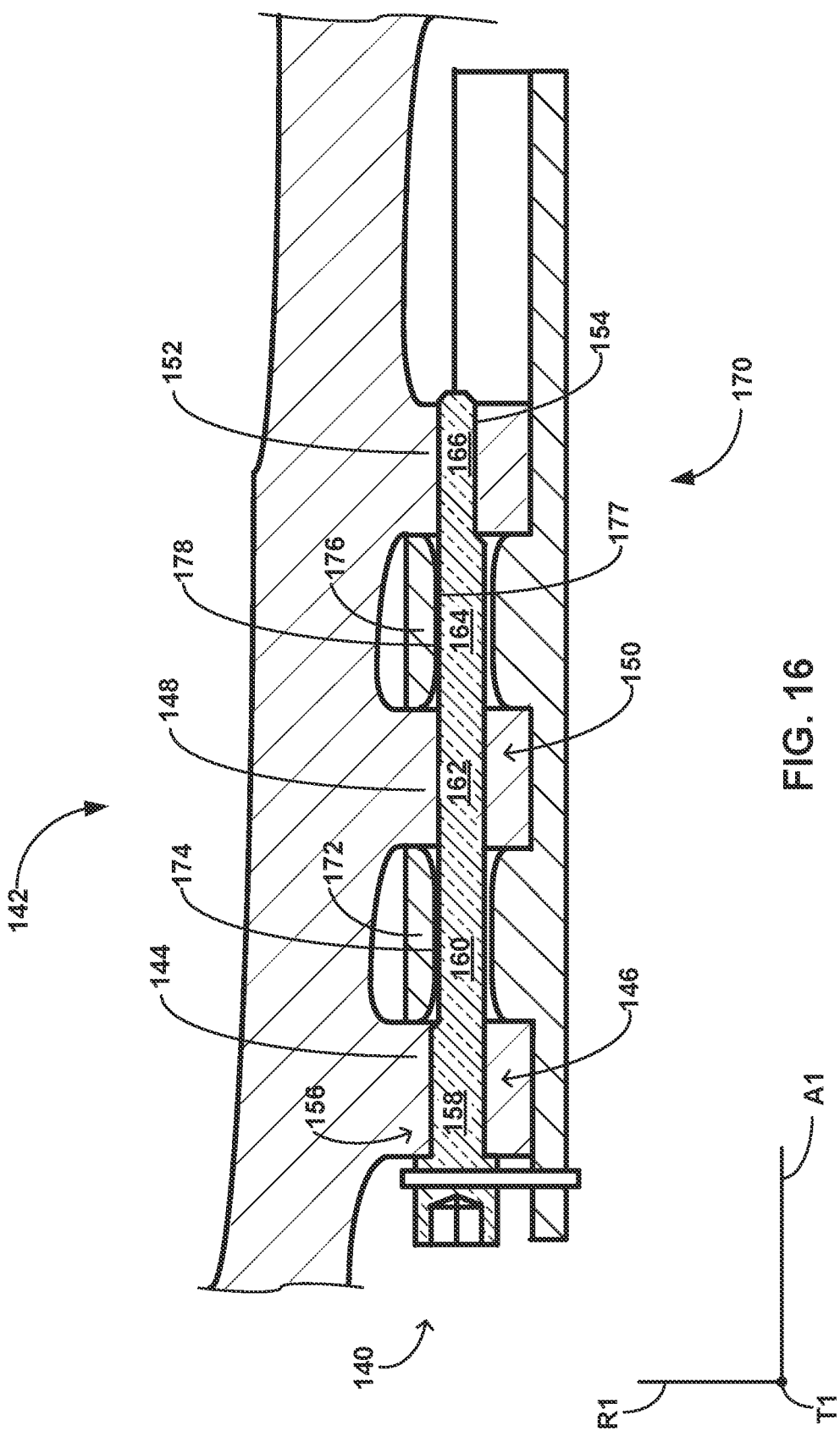
FIG. 16 is a plan view with selected cross-sections of an example assembly including a rotor drive key on an interior surface of a wheel.

Fastener 80 may include one or more additional shank sections attached to fastener shank 82 and intersected by bolt axis B1. Rotor drive key 74 may include one or more key bearing surfaces configured to engage the one or more additional shank sections. For example, FIG. 16 illustrates a fastener 140 and a wheel 142. Wheel 142 includes wheel boss 144 having boss aperture 146, wheel boss 148 having boss aperture 150, and wheel boss 152 having boss aperture 154. Fastener 140 may be an example of fastener 80 and wheel 142 may be an example of wheel 10. Fastener 140 includes shank 156, with shank 156 including proximal shank section 158, medial shank section 160, distal shank section 162, with distal shank section 162 attached to a portion of shank 156 including second medial portion 164 and a second distal portion 166. Rotor drive key 170 includes a support structure 172 including key bearing surface 174, and includes a second support structure 176 including a second key bearing surface 178. Rotor drive key 170 may be an example of rotor drive key 72.

Shank 156, proximal shank section 158, medial shank section 160, and distal shank section 162 of fastener 140 may be configured similarly to shank 82, proximal shank section 83, medial shank section 89, and distal shank section 85 of fastener 80. Wheel 142, wheel boss 148, boss aperture 150, wheel boss 152, and boss aperture 154 may be configured similarly to wheel 10, wheel boss 72, boss aperture 86, wheel boss 73, and boss aperture 87. Rotor drive key 170, support structure 172, and key bearing surface 174 may be configured similarly to rotor drive key 72, support structure 76, and key bearing surface 77.

Second medial portion 164 includes a second shank surface 177 configured to engage a second key bearing surface 178 of rotor drive key 74. Second shank surface 177 may be configured relative to second key bearing surface 178 in a manner similar to the configuration of shank surface 84 with respect to key bearing surface 77. For example, second shank surface 177 may be configured in a manner similar to shank surface 94 and/or shank surface 104.

Second support structure 176 may be configured in a manner similar to support structure 76, and may be configured relative to rotor drive key 170 in a manner similar to the configuration of support structure 76 with respect to rotor drive key 74. Second key bearing surface 178 may be configured in a manner similar to key bearing surface 77, and may be configured relative to support structure 176 in a manner similar to the configuration of key bearing surface 77 with respect to support structure 75.

Second distal portion 166 is configured to engage and/or extend into boss aperture 154. Second distal portion 166 may be configured relative to boss aperture 154 in a manner similar to the configuration of distal portion 85 with respect to boss aperture 87. Boss aperture 154 may be configured with respect to wheel boss 152 in a manner similar to the configuration of boss aperture 87 with respect to wheel boss 73 and/or the configuration of boss aperture 86 with respect to wheel boss 72.

Fastener 80 may have any number of additional shank sections and rotor drive key 72 may have any number of additional key bearing surfaces, including or in addition to those additional shank sections and additional key bearing surfaces depicted in FIG. 16.

Figure 17:
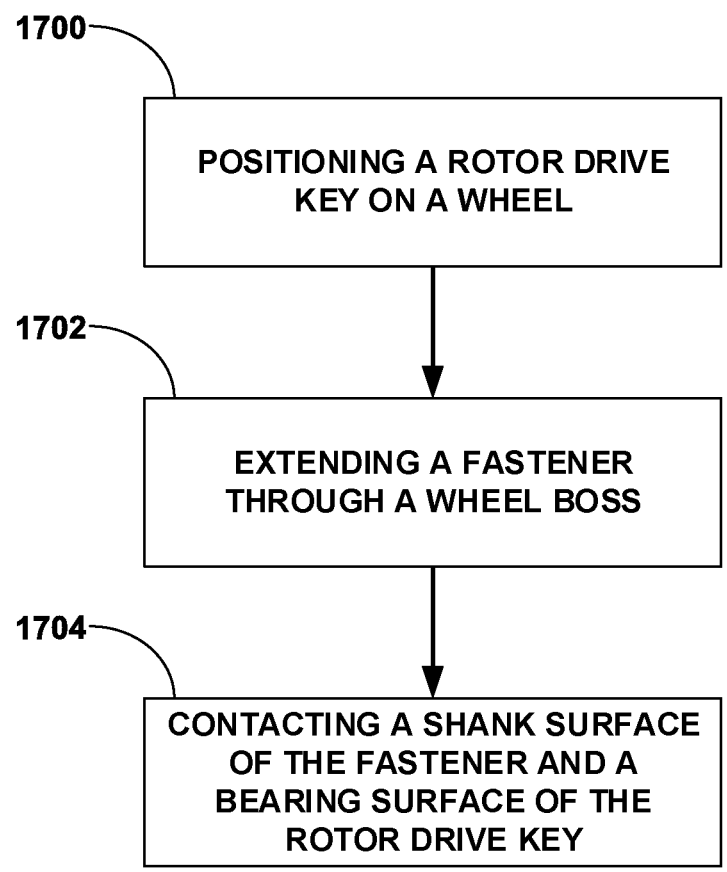
FIG. 17 is a flow diagram illustrating an example technique of attaching a rotor drive key to an interior surface of a wheel

FIG. 17 illustrates a flow diagram of an example technique for attaching a rotor drive key and fastener to a wheel. Although the technique is described with reference to rotor drive key 74, fastener 80, 90, 100 and wheel 10 of FIGS. 3-15, in other examples, the technique may be used with another rotor drive key, fastener, and wheel.

The technique includes positioning rotor drive key 74 on wheel 10 (1700). Rotor drive key 74 may be positioned to at least partially cover wheel boss 72 and/or 73 extending from an interior surface 14 of wheel 10. For example, rotor drive key 74 may include a trough 59 configured to partially surround wheel boss 72 and/or wheel boss 73 when rotor drive key 74 is positioned on wheel 10. Trough first side 62 may engage a first side of wheel boss 72 (e.g., boss first side 127 of wheel boss 123) when rotor drive key 74 is positioned on wheel 10. Trough second side 63 may engage a second side of wheel boss 72 (e.g., boss second side 128 of wheel boss 123) when rotor drive key 74 is positioned on wheel 10. Trough first side 62 may engage a first side of wheel boss 73 (e.g., boss first side 127 of wheel boss 123) when rotor drive key 74 is positioned and/or placed on wheel 10. Trough second side 63 may engage a second side of wheel boss 73 (e.g., boss second side 128 of wheel boss 123) when rotor drive key 74 is positioned on wheel 10.

Rotor drive key 74 may include a front face 78 configured to engage wheel boss 72 and oppose movement of rotor drive key 74 toward wheel boss 72, and may include a back face 79 configured to engage wheel boss 73 and oppose movement of rotor drive key 74 toward wheel boss 73. Rotor drive key 74 may include a support structure 76 which includes front face 78 and back face 79. Front face 78 may engage boss back surface 122 of wheel boss 123 (e.g., a surface of wheel boss 72). Back face 79 may engage boss front surface 121 of wheel boss 123 (e.g., a surface of wheel boss 73). Support structure 76 may substantially extend from trough base 61 and insert between wheel boss 72 and wheel boss 73 when rotor drive key 74 is positioned on wheel 10.

Rotor drive key 74 may be configured such that a support structure slot 75 substantially aligns with a boss aperture 86 extending through wheel boss 72 when rotor drive key 74 is positioned on wheel 10. Rotor drive key 74 may be configured such that support structure slot 75 substantially aligns with a boss aperture 87 extending at least into wheel boss 73 when rotor drive key 74 is positioned on wheel 10.

The technique further includes extending a fastener 80, 90, 100 through wheel boss 72 (1702). Fastener 80, 90, 100 may be extended through boss aperture 87 of wheel boss 72. The technique further includes contacting shank surface 84, 94, 104 and key bearing surface 77 (1704). Fastener 80, 90, 100 may contact a key bearing surface 77 of support structure 76 when extended through boss aperture 87. Fastener 80, 90, 100 may be further extended into boss aperture 87 of wheel boss 73.

Fastener 80, 90, 100 may be configured such that, when fastener 80, 90, 100 is inserted through wheel boss 72 in an axial direction A1 of wheel 10, rotation of fastener 80, 90, 100 around a fastener axis B, B1, B2 establishes contact and/or increases a contact pressure between shank surface 84, 94, 104 and key bearing surface 77. In some examples, shank surface 84, 94, 104 is a cam surface relative to fastener axis B, B1, B2. In these examples, an operator, alone or with the aid of machinery, may place shank surface 84, 94, 104 adjacent to key bearing surface 77 and rotate fastener 80 around fastener axis B, B1, B2 to bring shank surface 84, 94, 104 into contact with key bearing surface 77 and/or to increase a contact pressure between shank surface 84, 94, 104 and key bearing surface 77. Thus, in some examples, the technique of FIG. 16 includes rotating fastener 80, 90, 100 around fastener axis B, B1, B2 to increase a contact pressure between shank surface 84, 94, 104 and key bearing surface 77. For example, the technique may include rotating fastener 80, 90, 100 to generate a contact pressure between rotor drive key 74 and wheel boss 72 (e.g., at contact area C1) and/or between rotor drive key 74 and wheel boss 73 (e.g., at contact area C2).

In some examples, fastener 80, 100, may include a first section 110 and a second section 111 (FIGS. 9A-12B). Second section 111 may have a greater curvature than first section 110, and a contact area S may join second section 111 and first section 110. In these examples, an operator, alone or with the aid of machinery, may place first section 110 adjacent to key bearing surface 77 and rotate fastener 80, 100 around fastener axis B, B2 to bring contact area S into contact with key bearing surface 77 and/or to increase a contact pressure between shank surface 84, 104 and key bearing surface 77. The operator can rotate fastener 80, 100 around fastener axis B, B2 until contact area S slides past key bearing surface 77 and second surface 111 is in contact with key bearing surface 77. The operator may rotate fastener 80, 100 until an alteration in the required torque (e.g., a leveling off or a decrease in torque) is sensed by the operator.

In some example, the technique of FIG. 17 may include extending retaining pin 66 through some portion of fastener 80, 90, 100 and securing fastener 80, 90, 100 in a rotational position relative to rotor drive key 74. Retaining pin 66 may be extended through pin access 68, 113 of fastener head 81, 91, 101. The technique may include rotating fastener 80, 90, 100 until pin access 68, 113 access substantially aligns with key pin access 65 of rotor drive key 74. The technique may include inserting retaining pin 66 into key pin access 65 of rotor drive key 74.

Various examples have been described. These and other examples are within the scope of the following claims.

What is claimed is:

1. An assembly comprising:
    a rotor drive key configured to be positioned between a wheel boss of a wheel and an axis of the wheel, wherein the rotor drive key defines a key bearing surface; and
    a fastener configured to extend through the wheel boss when the rotor drive key is positioned between the wheel boss and the axis,
        wherein the fastener comprises a shank defining a shank surface,
        wherein the shank surface is configured to contact the key bearing surface of the rotor drive key when the fastener extends through the wheel boss,
        wherein the fastener is configured to limit movement of the rotor drive key relative to the wheel boss, and
        wherein the shank defines a fastener axis and the shank surface defines a displacement from the fastener axis to the shank surface and perpendicular to the fastener axis, wherein the displacement varies from a minimum displacement to a maximum displacement greater than the minimum displacement.

2. The assembly of claim 1, wherein the fastener is configured to extend through the wheel boss in an axial direction of the wheel.

3. The assembly of claim 1, wherein the fastener is configured to limit movement of the rotor drive key in a radial direction of the wheel when the fastener extends through the wheel boss and the shank surface contacts the key bearing surface.

4. The assembly of claim 1, wherein the fastener is configured such that the shank surface increases a contact pressure with the key bearing surface when the fastener extends through the wheel boss and the rotor drive key is positioned between the wheel boss and the axis and when the fastener is rotated around an axis of the fastener shank.

5. The assembly of claim 1, wherein the shank surface includes a first section and a second section joined to the first section, wherein an outer surface of the second section has a greater curvature than an outer surface of the first section.

6. The assembly of claim 1, wherein the shank surface is between a proximal portion and a distal portion of the fastener, wherein the distal portion defines a distal portion displacement from the fastener axis to a surface of the distal section and perpendicular to the fastener axis, wherein the distal portion displacement is less than the maximum displacement of the shank surface.

7. The assembly of claim 1, wherein:
    the rotor drive key comprises a support structure and the support structure comprises the key bearing surface,
    the fastener is configured to extend into the support structure, and
    the shank surface is configured to contact the key bearing surface of the rotor drive key when the fastener extends into the support structure.

8. The assembly of claim 7, wherein the support structure includes a bore configured to receive the fastener, wherein the key bearing surface defines at least part of the bore.

9. The assembly of claim 7, wherein the wheel boss is a first wheel boss, and wherein the support structure is configured to insert between the first wheel boss and a second wheel boss of the wheel, and wherein the fastener is configured to extend through the support structure when the shank surface contacts the key bearing surface.

10. The assembly of claim 9, wherein the support structure is configured to limit movement of the rotor drive key in an axial direction of the wheel when the support structure is positioned between the first wheel boss and the second wheel boss.

11. The assembly of claim 1, further comprising the wheel defining an interior surface and comprising the wheel boss along the interior surface, wherein the wheel boss comprises a pair of opposite sides, and wherein the rotor drive key defines a trough configured to surround at least a portion of each of the opposite sides when the rotor drive key is positioned between the wheel boss and the axis.

12. The assembly of claim 11, wherein the wheel boss is a first wheel boss and the interior surface of the wheel defines a second wheel boss, and wherein the trough is configured to surround at least a portion of the second wheel boss when the rotor drive key is positioned between the first wheel boss and the axis.

13. The assembly of claim 12, wherein the key bearing surface is between the first wheel boss and the second wheel boss when the rotor drive key is positioned between the first wheel boss and the axis and when the shank surface contacts the key bearing surface.

14. An assembly comprising:
    a vehicle wheel defining an interior surface and defining a first wheel boss and a second wheel boss along the interior surface;
    a rotor drive key configured to be positioned between the first wheel boss and an axis of the vehicle wheel, wherein the rotor drive key comprises a support structure and the support structure includes a key bearing surface, and wherein the support structure is configured to insert between the first wheel boss and the second wheel boss and limit movement of the rotor drive key in an axial direction of the vehicle wheel when the rotor drive key is positioned between the first wheel boss and the axis; and
    a fastener defining a shank surface,
        wherein the shank surface is configured to contact the key bearing surface of the rotor drive key when the rotor drive key is positioned between the first wheel boss and the axis and when the fastener extends through the first wheel boss in a substantially axial direction of the vehicle wheel,
        wherein the fastener is configured to extend through the first wheel boss, the support structure, and the second wheel boss when the shank surface contacts the key bearing surface, and
        wherein the fastener is configured to limit movement of the rotor drive key in a radial direction of the vehicle wheel when the rotor drive key is positioned between the first wheel boss and the axis and when the shank surface contacts the key bearing surface.

15. The assembly of claim 14, wherein the fastener is configured such that the shank surface increases a contact pressure with the key bearing surface when the shank surface contacts the key bearing surface and the fastener is rotated around a fastener axis of the fastener shank.

16. The assembly of claim 14, wherein the shank surface includes a first section and a second section joined to the first section, wherein an outer surface of the second section has a greater curvature than an outer surface of the first section.

17. A method comprising:
    positioning a rotor drive key between a first wheel boss of a vehicle wheel and an axis of the vehicle wheel, wherein the rotor drive key comprises a key bearing surface;

inserting a support structure of the rotor drive key between the first wheel boss and a second wheel boss of the vehicle wheel;

extending a fastener comprising a shank surface through the first wheel boss, the support structure, and the second wheel boss; and contacting the shank surface and the key bearing surface to limit movement of the rotor drive key in a radial direction of the vehicle wheel.

18. The assembly of claim 14, wherein the support structure includes a bore configured to receive the fastener, wherein the key bearing surface defines at least part of the bore.

19. The assembly of claim 14, wherein the key bearing surface is between the first wheel boss and the second wheel boss when the rotor drive key is positioned between the first wheel boss and the axis and when the shank surface contacts the key bearing surface.

20. The method of claim 17, further comprising rotating the fastener around a fastener axis of a fastener shank to increase a contact pressure between the key bearing surface and the shank surface, wherein the fastener shank defines the shank surface.

* * * * *